(12) United States Patent
Venugopal et al.

(10) Patent No.: US 12,375,135 B2
(45) Date of Patent: Jul. 29, 2025

(54) CODEBOOK SELECTION

(71) Applicant: QUALCOMM Incorporated, San Diego, CA (US)

(72) Inventors: Kiran Venugopal, Green Brook, NJ (US); Wooseok Nam, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 18/162,626

(22) Filed: Jan. 31, 2023

(65) Prior Publication Data
US 2024/0259057 A1    Aug. 1, 2024

(51) Int. Cl.
*H04B 7/04* (2017.01)
*H04B 7/022* (2017.01)
*H04B 7/0456* (2017.01)

(52) U.S. Cl.
CPC .......... *H04B 7/0456* (2013.01); *H04B 7/022* (2013.01)

(58) Field of Classification Search
CPC .............................. H04B 7/0456; H04B 7/022
See application file for complete search history.

(56) References Cited

U.S. PATENT DOCUMENTS

| | | | | |
|---|---|---|---|---|
| 11,936,456 | B2* | 3/2024 | Grossmann | H04B 7/0478 |
| 2021/0320704 | A1* | 10/2021 | Hao | H04B 7/0469 |
| 2022/0166475 | A1* | 5/2022 | Park | H04L 27/26 |
| 2022/0255598 | A1* | 8/2022 | Gao | H04B 7/0456 |
| 2022/0255609 | A1* | 8/2022 | Venkatesh | H04B 7/0626 |
| 2022/0416857 | A1* | 12/2022 | Fan | H04L 5/0051 |
| 2023/0124262 | A1* | 4/2023 | Kim | H04L 1/1812 370/329 |
| 2024/0088968 | A1* | 3/2024 | Lo | H04B 7/0626 |

FOREIGN PATENT DOCUMENTS

| | | |
|---|---|---|
| WO | WO-2018143995 A1 | 8/2018 |
| WO | WO-2020182269 A1 | 9/2020 |
| WO | WO-2023003401 A1 | 1/2023 |

OTHER PUBLICATIONS

International Search Report and Written Opinion—PCT/US2023/082676—ISA/EPO—Jul. 2, 2024.
NEC: "Discussion on CSI Enhancement", 3GPP TSG RAN WG1 #110bis-e, R1-2209140, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Sep. 30, 2022, pp. 1-5, XP052277058, Sections 2.1. and 2.2.
Partial International Search Report—PCT/US2023/082676—ISA/EPO—Apr. 22, 2024.

* cited by examiner

*Primary Examiner* — Dac V Ha
(74) *Attorney, Agent, or Firm* — Harrity & Harrity, LLP

(57) ABSTRACT

Various aspects of the present disclosure generally relate to wireless communication. In some aspects, a user equipment (UE) may generate a recommendation for a first codebook that is for a single transmit receive point (TRP) and that does not include a time domain (TD) or Doppler domain (DD) basis, or for a second codebook that is for multiple TRPs or that includes a TD or DD basis. The UE may transmit the recommendation. Numerous other aspects are described.

30 Claims, 15 Drawing Sheets

CODEBOOK SELECTION

FIELD OF THE DISCLOSURE

Aspects of the present disclosure generally relate to wireless communication and to techniques and apparatuses for codebook selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include generating a recommendation for a first codebook that is for a single transmit receive point (TRP) and that does not include a time domain (TD) or Doppler domain (DD) basis, or for a second codebook that is for multiple TRPs or that includes a TD or DD basis. The method may include transmitting the recommendation.

Some aspects described herein relate to a method of wireless communication performed by a network entity. The method may include receiving a recommendation for a first codebook that is for a single TRP and that does not include a TD or DD basis, or for a second codebook that is for multiple TRPs or that includes a TD or DD basis. The method may include transmitting a codebook configuration that is based at least in part on the recommendation.

Some aspects described herein relate to a method of wireless communication performed by a UE. The method may include receiving a codebook structure for selecting a TD or DD basis for a codebook based at least in part on one or more configuration conditions. The method may include selecting the TD or DD basis for the codebook based at least in part on a comparison of one or more current conditions and the one or more configuration conditions.

Some aspects described herein relate to a method of wireless communication performed by a network entity. The method may include generating a codebook structure for selecting a TD or DD basis for a codebook based at least in part on one or more configuration conditions. The method may include transmitting the codebook structure.

Some aspects described herein relate to a UE for wireless communication. The UE may include memory, one or more processors coupled to the memory, and instructions stored in the memory and executable by the one or more processors. The instructions may be executable by the one or more processors to cause the UE to generate a recommendation for a first codebook that is for a single TRP and that does not include a TD or DD basis, or for a second codebook that is for multiple TRPs or that includes a TD or DD basis. The instructions may be executable by the one or more processors to cause the UE to transmit the recommendation.

Some aspects described herein relate to a network entity for wireless communication. The network entity may include memory, one or more processors coupled to the memory, and instructions stored in the memory and executable by the one or more processors. The instructions may be executable by the one or more processors to cause the network entity to receive a recommendation for a first codebook that is for a single TRP and that does not include a TD or DD basis, or for a second codebook that is for multiple TRPs or that includes a TD or DD basis. The instructions may be executable by the one or more processors to cause the network entity to transmit a codebook configuration that is based at least in part on the recommendation.

Some aspects described herein relate to a UE for wireless communication. The UE may include memory, one or more processors coupled to the memory, and instructions stored in the memory and executable by the one or more processors. The instructions may be executable by the one or more processors to cause the UE to receive a codebook structure for selecting a TD or DD basis for a codebook based at least in part on one or more configuration conditions. The instructions may be executable by the one or more processors to cause the UE to select the TD or DD basis for the codebook based at least in part on a comparison of one or more current conditions and the one or more configuration conditions.

Some aspects described herein relate to a network entity for wireless communication. The network entity may include memory, one or more processors coupled to the memory, and instructions stored in the memory and executable by the one or more processors. The instructions may be executable by the one or more processors to cause the network entity to generate a codebook structure for selecting a TD or DD basis for a codebook based at least in part on one or more configuration conditions. The instructions may be executable by the one or more processors to cause the network entity to transmit the codebook structure.

Some aspects described herein relate to a non-transitory computer-readable medium that stores one or more instructions for wireless communication by a UE. The one or more instructions, when executed by one or more processors of the UE, may cause the UE to generate a recommendation for a first codebook that is for a single TRP and that does not include a TD or DD basis, or for a second codebook that is for multiple TRPs or that includes a TD or DD basis. The one or more instructions, when executed by one or more processors of the UE, may cause the UE to transmit the recommendation.

Some aspects described herein relate to a non-transitory computer-readable medium that stores one or more instructions for wireless communication by a network entity. The one or more instructions, when executed by one or more processors of the network entity, may cause the network entity to receive a recommendation for a first codebook that is for a single TRP and that does not include a TD or DD basis, or for a second codebook that is for multiple TRPs or that includes a TD or DD basis. The one or more instructions, when executed by one or more processors of the network entity, may cause the network entity to transmit a codebook configuration that is based at least in part on the recommendation.

Some aspects described herein relate to a non-transitory computer-readable medium that stores one or more instructions for wireless communication by a UE. The one or more instructions, when executed by one or more processors of the UE, may cause the UE to receive a codebook structure for selecting a TD or DD basis for a codebook based at least in part on one or more configuration conditions. The one or more instructions, when executed by one or more processors of the UE, may cause the UE to select the TD or DD basis for the codebook based at least in part on a comparison of one or more current conditions and the one or more configuration conditions.

Some aspects described herein relate to a non-transitory computer-readable medium that stores one or more instructions for wireless communication by a network entity. The one or more instructions, when executed by one or more processors of the network entity, may cause the network entity to generate a codebook structure for selecting a TD or DD basis for a codebook based at least in part on one or more configuration conditions. The one or more instructions, when executed by one or more processors of the network entity, may cause the network entity to transmit the codebook structure.

Aspects generally include a method, apparatus, system, computer program product, non-transitory computer-readable medium, UE, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
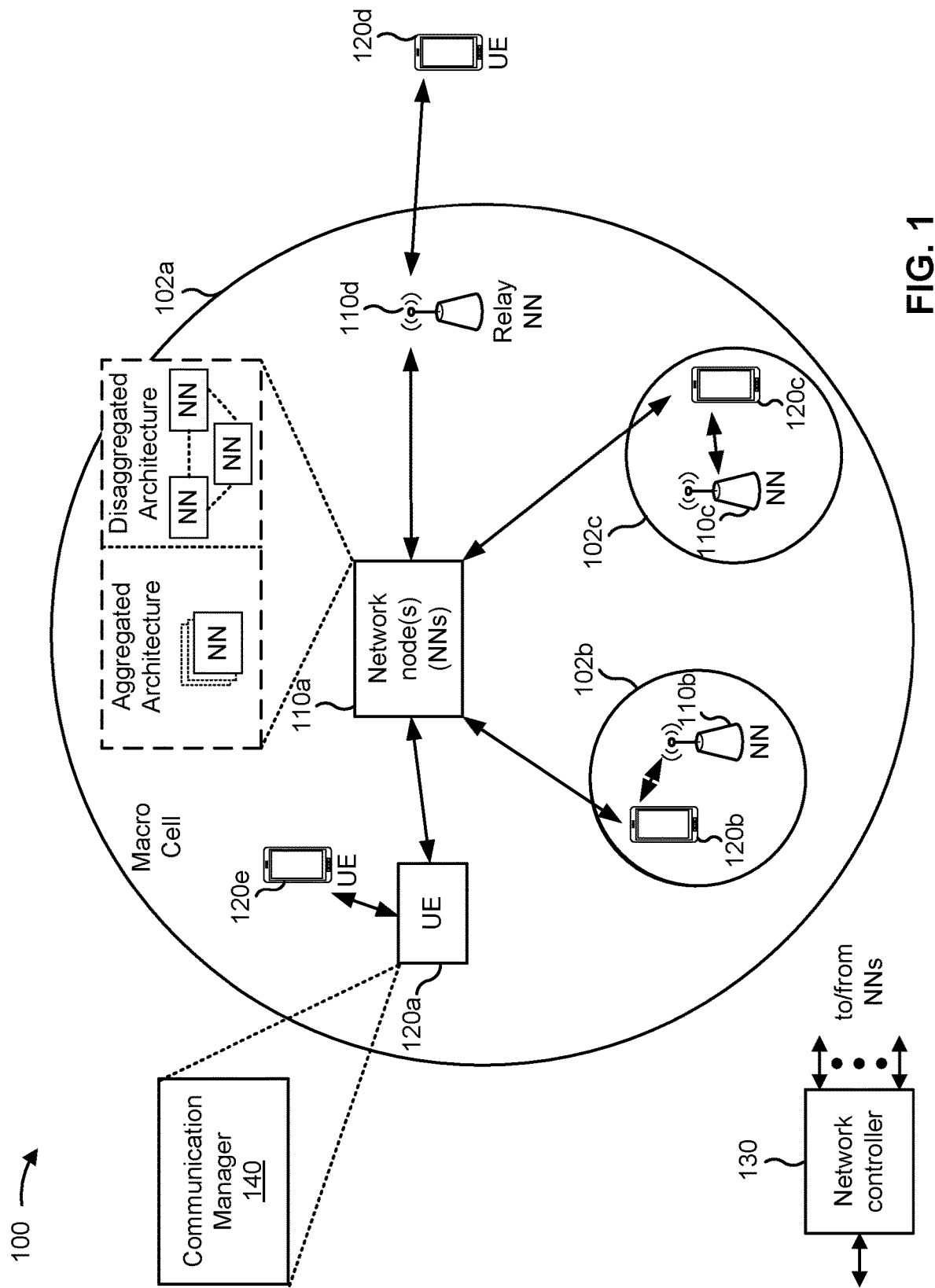
FIG. 1 is a diagram illustrating an example of a wireless network, in accordance with the present disclosure.

Coverage for a user equipment (UE) may be limited to a single transmit receive point (TRP), and mobility of the UE may be restricted such that legacy channel state information (CSI) can ensure reliable communication. A legacy codebook (e.g., Third Generation Partnership Project (3GPP) standard Release 17 codebook or a codebook of an earlier release) may be characterized as a codebook that is for a single TRP and that does not include a time domain (TD) or Doppler domain (DD) basis. A Release 18 codebook (non-legacy codebook) may be characterized as a codebook that is for multiple TRPs, includes a TD or DD basis, or both. Release 18 codebook enhancements can involve higher computation and processing at the UE side, in addition to higher measurement and reporting resource overhead. Benefits from Release 18 refinement can be found mainly in the high Doppler scenario and in multiple TRP (mTRP) coherent joint transmission (CJT) operation, where the UE is in the coverage area of multiple TRPs. If a UE does not need to use a Release 18 codebook (e.g., single TRP, low mobility), it is a waste of power, processing resources, and signaling resources to use the Release 18 codebook.

According to various aspects described herein, a UE may request that a network entity dynamically switch between a first codebook (e.g., a Release 17 codebook that is for a single TRP and that does not include a TD or DD basis) and a second codebook (e.g., a Release 18 codebook that is for multiple TRPs, that includes a TD or DD basis, or both). The network entity may use these codebooks for downlink transmissions. For example, a UE may generate a recommendation by selecting the first codebook or the second codebook. The UE may transmit the recommendation. The network entity may transmit a codebook configuration that is based at least in part on the recommendation. The network entity may accept the recommendation, or reject the recommendation and select a different codebook than recommended. By providing a recommendation, the UE may have more flexibility to select a codebook (e.g., Release 17 codebook or Release 18 codebook) that is appropriate to conditions or to a UE status.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a TRP, a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the 3GPP, the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may generate a recommendation for a first codebook that is for a single TRP and that does not include a TD or DD basis, or for a second codebook that is for multiple TRPs or that includes a TD or DD basis. The communication manager 140 may transmit the recommendation.

In some aspects, the communication manager 140 may receive a codebook structure for selecting a TD or DD basis for a codebook based at least in part on one or more configuration conditions. The communication manager 140 may select the TD or DD basis for the codebook based at least in part on a comparison of one or more current conditions and the one or more configuration conditions. Additionally, or alternatively, the communication manager 140 may perform one or more other operations described herein.

In some aspects, a network entity (e.g., network node 110) may include a communication manager 150. As described in more detail elsewhere herein, the communication manager 150 may receive a recommendation for a first codebook that is for a single TRP and that does not include a TD or DD basis, or for a second codebook that is for multiple TRPs or that includes a TD or DD basis. The communication manager 150 may transmit a codebook configuration that is based at least in part on the recommendation.

In some aspects, the communication manager 150 may generate a codebook structure for selecting a TD or DD basis for a codebook based at least in part on one or more configuration conditions. The communication manager 150 may transmit the codebook structure. Additionally, or alternatively, the communication manager 150 may perform one or more other operations described herein.

As indicated above, FIG. 1 is provided as an example. Other examples may differ from what is described with regard to FIG. 1.

Figure 2:
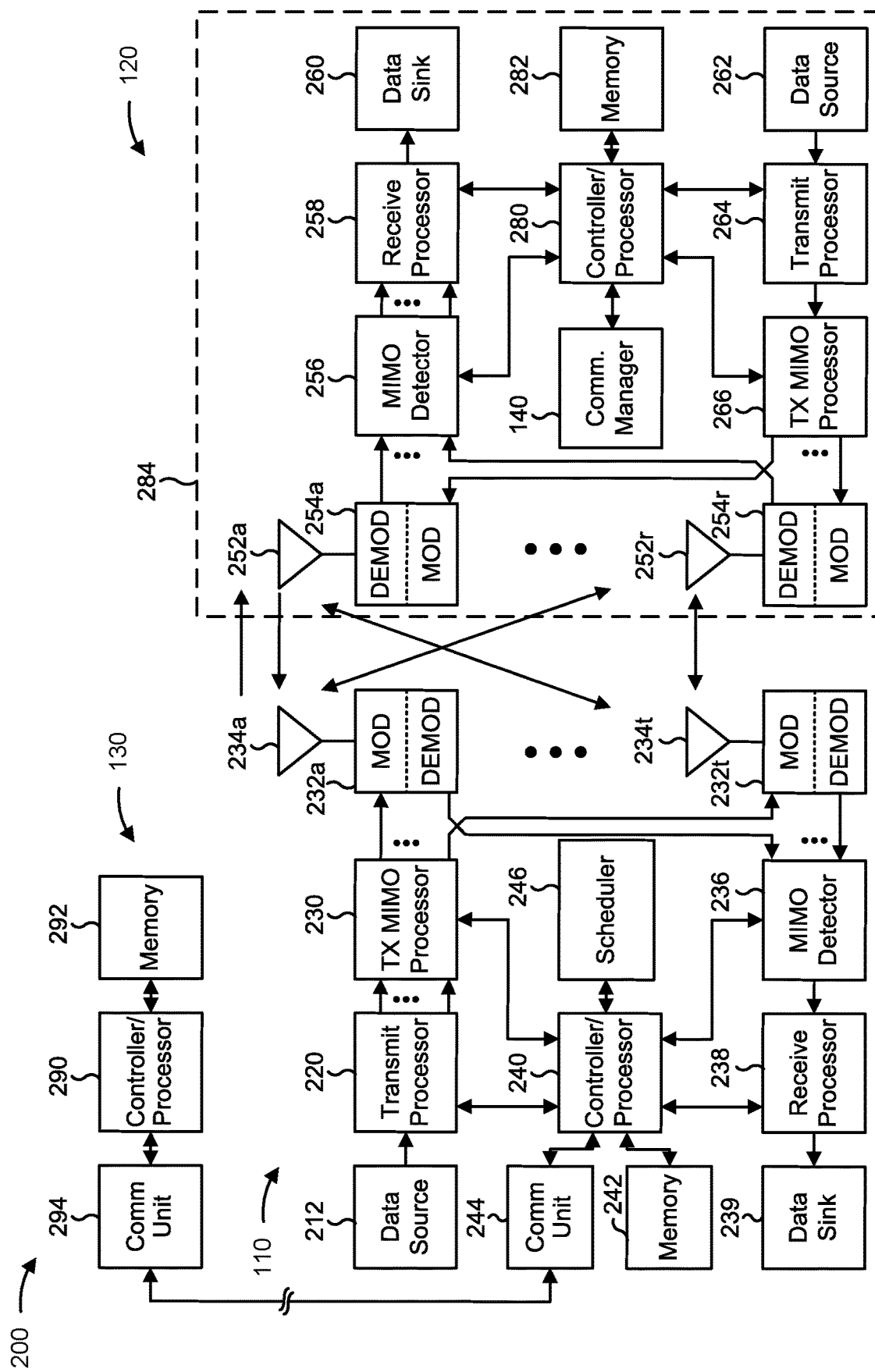
FIG. 2 is a diagram illustrating an example of a network entity (e.g., base station) in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-15).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-15).

A controller/processor of a network entity (e.g., controller/processor 240 a network node 110), the controller/processor 280 of the UE 120, and/or any other component(s) of FIG. 2 may perform one or more techniques associated with codebook selection, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 1000 of FIG. 10, process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, a UE (e.g., a UE 120) includes means for generating a recommendation for a first codebook that is for a single TRP and that does not include a TD or DD basis, or for a second codebook that is for multiple TRPs or that includes a TD or DD basis; and/or means for transmitting the recommendation. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., a network node 110) includes means for receiving a recommendation for a first codebook that is for a single TRP and that does not include a TD or DD basis, or for a second codebook that is for multiple TRPs or that includes a TD or DD basis; and/or means for transmitting a codebook configuration that is based at least in part on the recommendation. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE (e.g., a UE 120) includes means for receiving a codebook structure for selecting a TD or DD basis for a codebook based at least in part on one or more configuration conditions; and/or means for selecting the TD or DD basis for the codebook based at least in part on a comparison of one or more current conditions and the one or more configuration conditions. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., a network node 110) includes means for generating a codebook structure for selecting a TD or DD basis for a codebook based at least in part on one or more configuration conditions; and/or means for transmitting the codebook structure. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

As indicated above, FIG. 2 is provided as an example. Other examples may differ from what is described with regard to FIG. 2.

Figure 3:
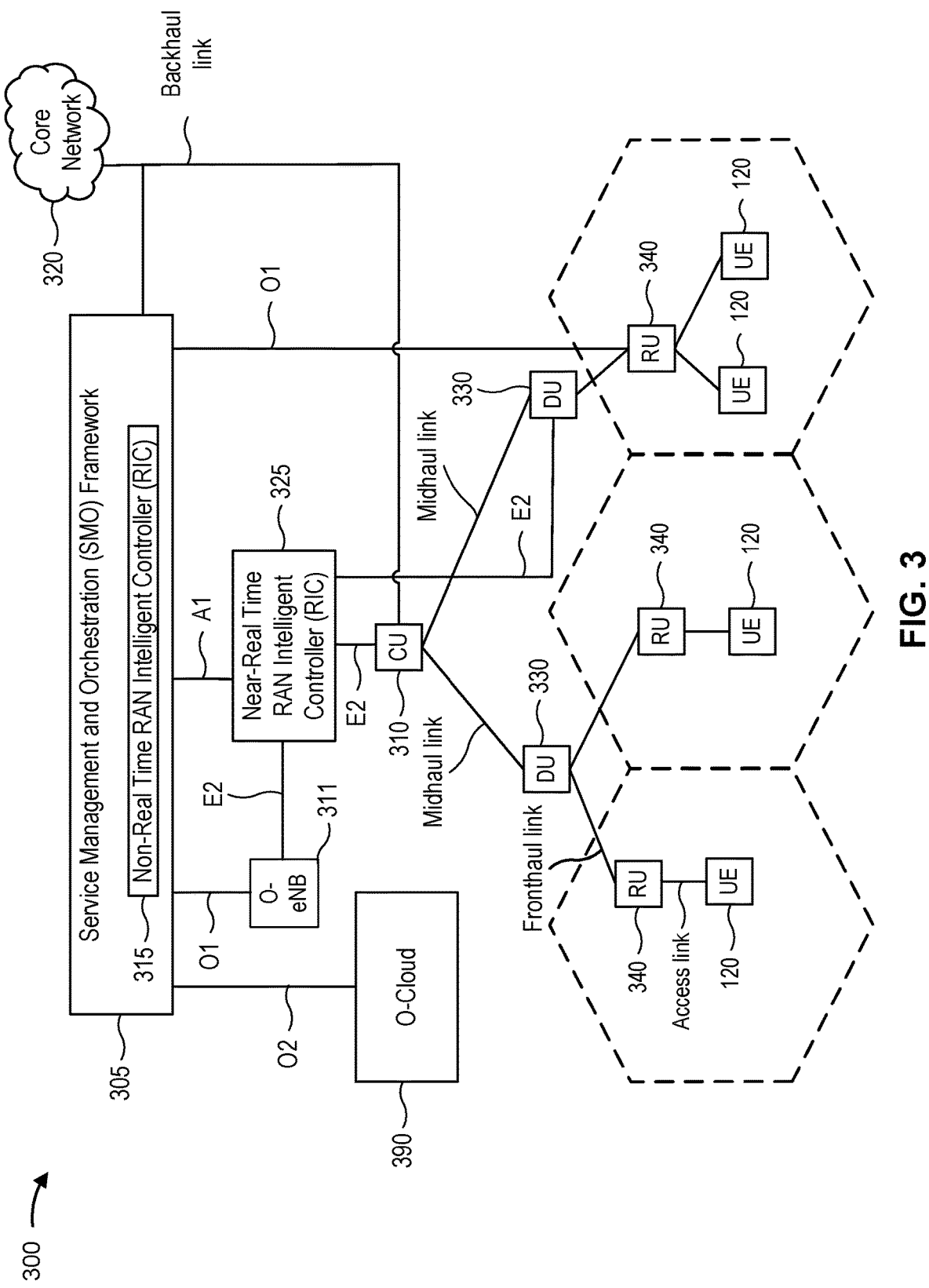
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUS (O-DUs")" and "O-RAN RUS (O-RUS)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units, i.e., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
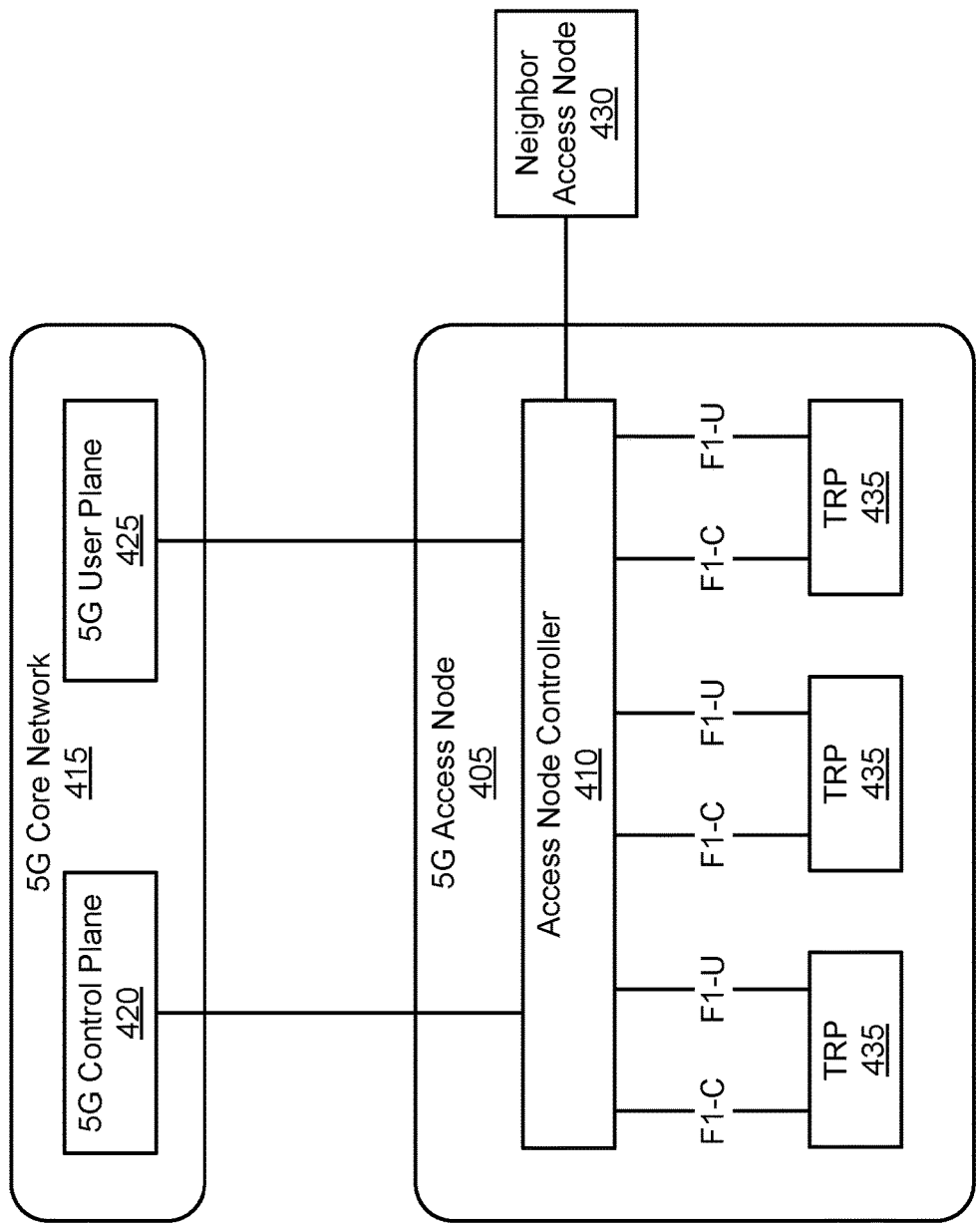
FIG. 4 illustrates an example logical architecture of a distributed random access network, in accordance with the present disclosure.

FIG. 4 illustrates an example logical architecture of a distributed RAN 400, in accordance with the present disclosure.

A 5G access node 405 may include an access node controller 410. The access node controller 410 may be a CU of the distributed RAN 400. In some aspects, a backhaul interface to a 5G core network 415 may terminate at the access node controller 410. The 5G core network 415 may include a 5G control plane component 420 and a 5G user plane component 425 (e.g., a 5G gateway), and the backhaul interface for one or both of the 5G control plane and the 5G user plane may terminate at the access node controller 410. Additionally, or alternatively, a backhaul interface to one or more neighbor access nodes 430 (e.g., another 5G access node 405 and/or an LTE access node) may terminate at the access node controller 410.

The access node controller 410 may include and/or may communicate with one or more TRPs 435 (e.g., via an F1 Control (F1-C) interface and/or an F1 User (F1-U) interface). A TRP 435 may be a DU of the distributed RAN 400. In some aspects, a TRP 435 may correspond to a network node 110 described above in connection with FIG. 1. For example, different TRPs 435 may be included in different base stations 110. Additionally, or alternatively, multiple TRPs 435 may be included in a single network node 110. In some aspects, a network node 110 may include a CU (e.g., access node controller 410) and/or one or more DUs (e.g., one or more TRPs 435). In some cases, a TRP 435 may be referred to as a cell, a panel, an antenna array, or an array.

A TRP 435 may be connected to a single access node controller 410 or to multiple access node controllers 410. In some aspects, a dynamic configuration of split logical functions may be present within the architecture of distributed RAN 400. For example, a PDCP layer, an RLC layer, and/or a MAC layer may be configured to terminate at the access node controller 410 or at a TRP 435.

In some aspects, multiple TRPs 435 may transmit communications (e.g., the same communication or different communications) in the same transmission time interval (TTI) (e.g., a slot, a mini-slot, a subframe, or a symbol) or different TTIs using different quasi-co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 435 may be configured to individually (e.g., using dynamic selection) or jointly (e.g., using joint transmission with one or more other TRPs 435) serve traffic to a UE 120.

As indicated above, FIG. 4 is provided as an example. Other examples may differ from what was described with regard to FIG. 4.

Figure 5:
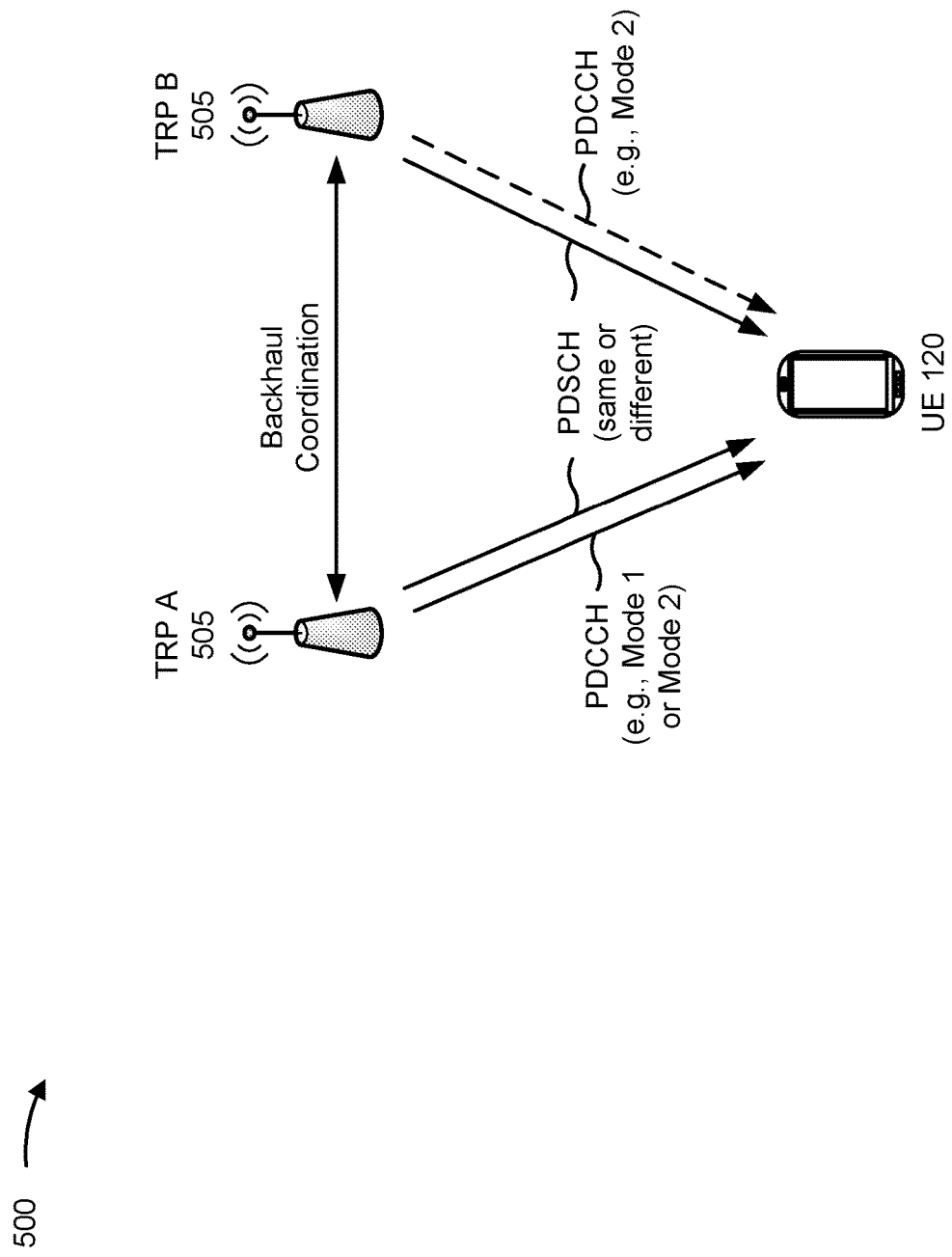
FIG. 5 is a diagram illustrating an example of multiple transmit receive point (TRP) communication (sometimes referred to as multi-panel communication), in accordance with the present disclosure.

FIG. 5 is a diagram illustrating an example 500 of multiple TRP (multi-TRP) communication (sometimes referred to as multi-panel communication), in accordance with the present disclosure. As shown in FIG. 5, multiple TRPs 505 may communicate with the same UE 120. A TRP 505 may correspond to a TRP 435 described above in connection with FIG. 4.

The multiple TRPs 505 (shown as TRP A and TRP B) may communicate with the same UE 120 in a coordinated manner (e.g., using coordinated multipoint transmissions) to improve reliability and/or increase throughput. The TRPs 505 may coordinate such communications via an interface between the TRPs 505 (e.g., a backhaul interface and/or an access node controller 410). The interface may have a smaller delay and/or higher capacity when the TRPs 505 are co-located at the same network node 110 (e.g., when the TRPs 505 are different antenna arrays or panels of the same network node 110), and may have a larger delay and/or lower capacity (as compared to co-location) when the TRPs 505 are located at different base stations 110. The different TRPs 505 may communicate with the UE 120 using different QCL relationships (e.g., different TCI states), different DMRS ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 505 (e.g., TRP A and TRP B) may transmit communications to the UE 120 on the same PDSCH. For example, a communication may be transmitted using a single codeword with different spatial layers for different TRPs 505 (e.g., where one codeword maps to a first set of layers transmitted by a first TRP 505 and maps to a second set of layers transmitted by a second TRP 505). As another example, a communication may be transmitted using multiple codewords, where different codewords are transmitted by different TRPs 505 (e.g., using different sets of layers). In either case, different TRPs 505 may use different QCL relationships (e.g., different TCI states) for different DMRS ports corresponding to different layers. For example, a first TRP 505 may use a first QCL relationship or a first TCI state for a first set of DMRS ports corresponding to a first set of layers, and a second TRP 505 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 505, and a second PDCCH may schedule a second codeword to be transmitted by a second TRP 505. Furthermore, first DCI (e.g., transmitted by the first TRP 505) may schedule a first PDSCH communication associated with a first set of DMRS ports with a first QCL relationship (e.g., indicated by a first TCI state) for the first TRP 505, and second DCI (e.g., transmitted by the second TRP 505) may schedule a second PDSCH communication associated with a second set of DMRS ports with a second QCL relationship (e.g., indicated by a second TCI state) for the second TRP 505. In this case, DCI (e.g., having DCI format 1_0 or DCI format 1_1) may indicate a corresponding TCI state for a TRP 505 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 5 is provided as an example. Other examples may differ from what is described with respect to FIG. 5.

Figure 6:
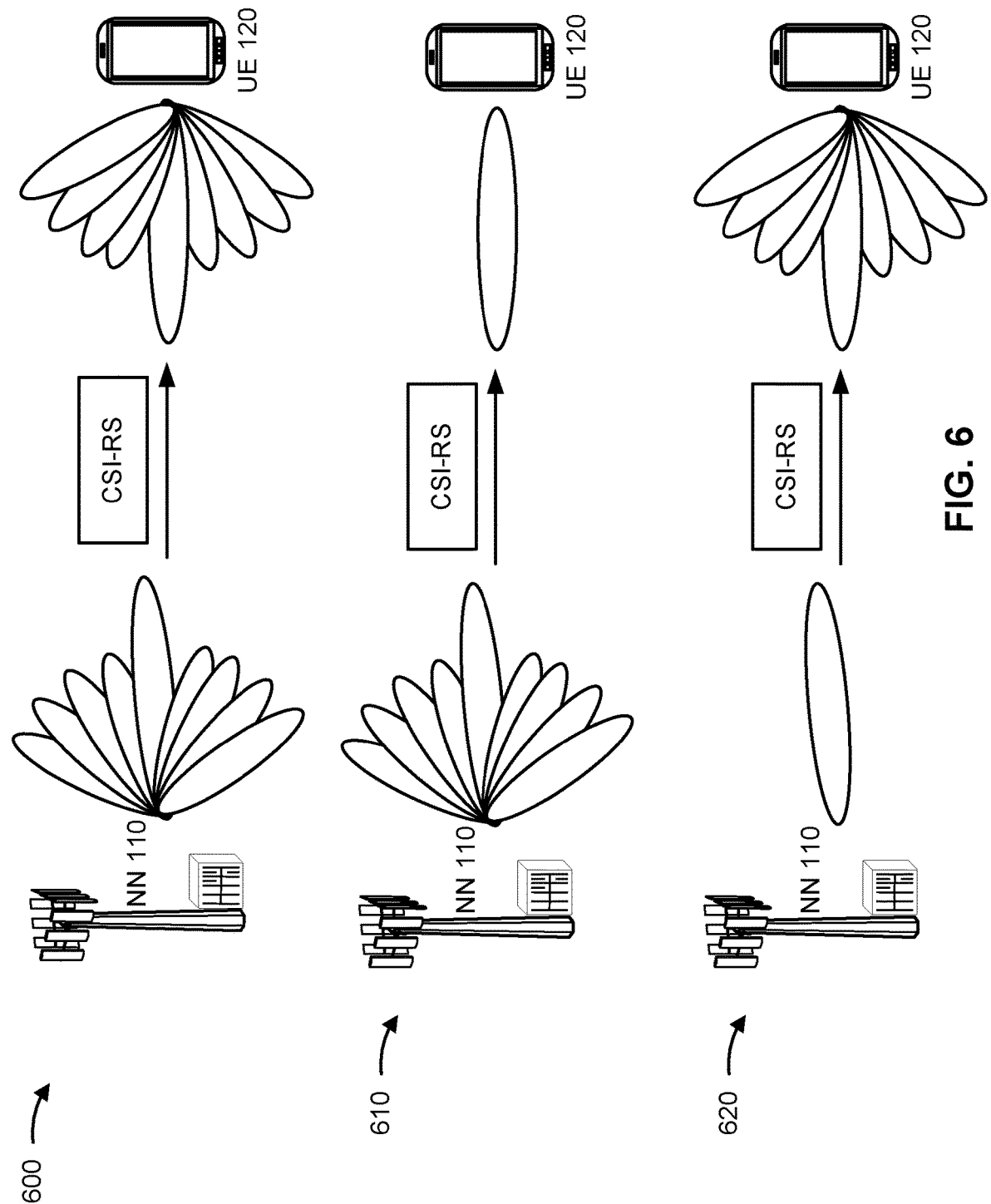
FIG. 6 is a diagram illustrating examples of channel state information reference signal beam management procedures, in accordance with the present disclosure.

FIG. 6 is a diagram illustrating examples 600, 610, and 620 of CSI reference signal (CSI-RS) beam management procedures, in accordance with the present disclosure. As shown in FIG. 6, examples 600, 610, and 620 include a UE 120 in communication with a network entity (e.g., network node 110) in a wireless network (e.g., wireless network 100). However, the devices shown in FIG. 6 are provided as examples, and the wireless network may support communication and beam management between other devices (e.g., between a UE 120 and a network node 110 or TRP, between a mobile termination node and a control node, between an IAB child node and an IAB parent node, and/or between a scheduled node and a scheduling node). In some aspects, the UE 120 and the network node 110 may be in a connected state (e.g., an RRC connected state).

As shown in FIG. 6, example 600 may include a network node (NN) 110 and a UE 120 communicating to perform beam management using CSI-RSs. Example 600 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 6 and example 600, CSI-RSs may be configured to be transmitted from the network node 110 to the UE 120. The CSI-RSs may be configured to be periodic (e.g., using RRC signaling), semi-persistent (e.g., using MAC control element (MAC CE) signaling), and/or aperiodic (e.g., using DCI).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same reference signal (RS) resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While example 600 has been described in connection with CSI-RSs, the first beam management process may also use synchronization signal blocks (SSBs) for beam management in a similar manner as described above.

As shown in FIG. 6, example 610 may include a network node 110 and a UE 120 communicating to perform beam management using CSI-RSs. Example 610 depicts a second beam management procedure (e.g., P2 CSI-RS beam management). The second beam management procedure may be referred to as a beam refinement procedure, a base station beam refinement procedure, a TRP beam refinement procedure, and/or a transmit beam refinement procedure. As shown in FIG. 6 and example 610, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 6, example 620 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 6 and example 620, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

As indicated above, FIG. 6 is provided as an example of beam management procedures. Other examples of beam management procedures may differ from what is described with respect to FIG. 6. For example, the UE 120 and the network node 110 may perform the third beam management procedure before performing the second beam management procedure, and/or the UE 120 and the network node 110 may perform a similar beam management procedure to select a UE transmit beam.

Figure 7:
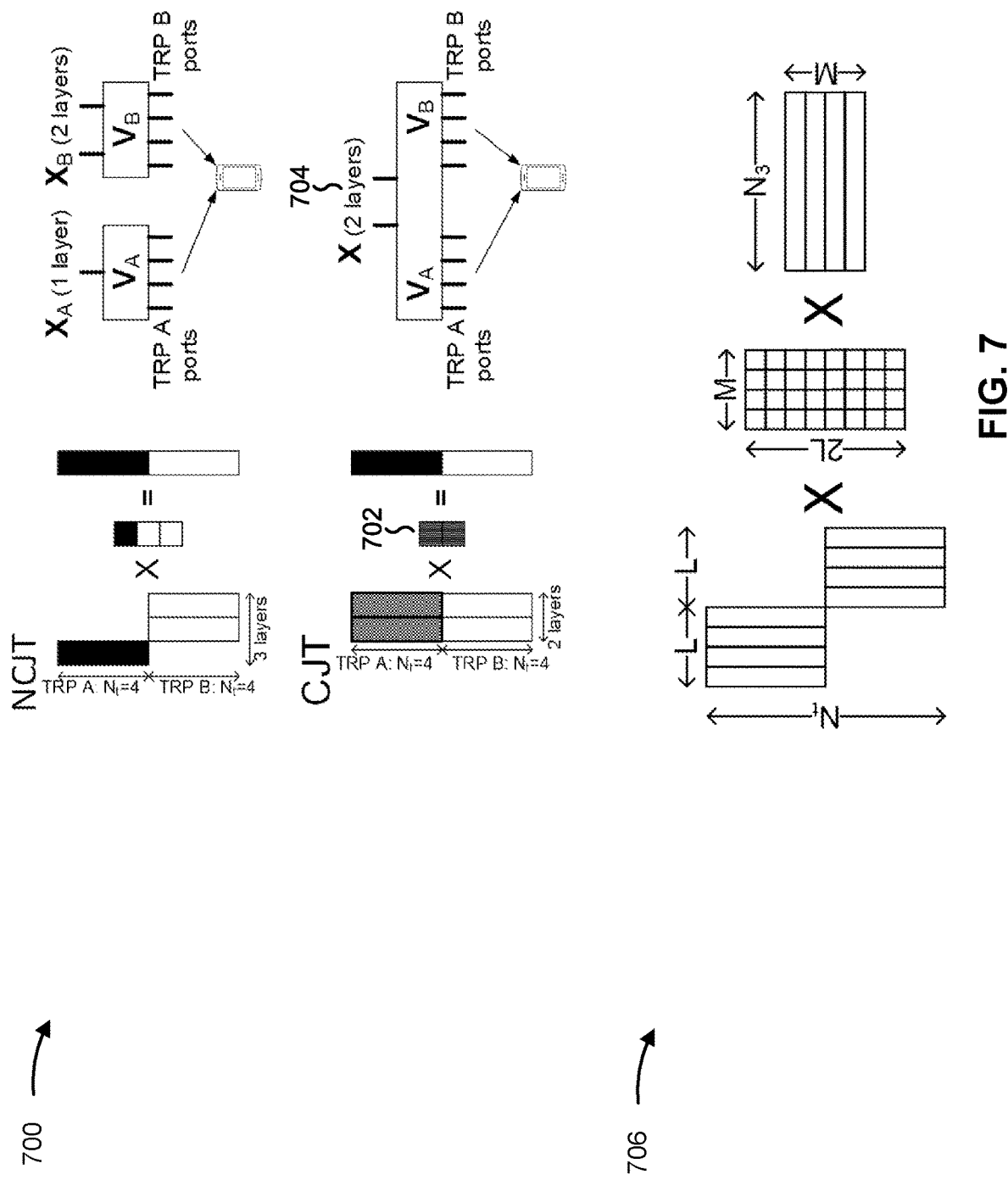
FIG. 7 is a diagram illustrating an example of coherent joint transmission and non-coherent joint transmission for multiple TRPs, in accordance with the present disclosure.

FIG. 7 is a diagram illustrating an example 700 of CJT and non-coherent joint transmission (NCJT) for multiple TRPs, in accordance with the present disclosure.

CJT involves multiple transmitters that each transmit a message with a phase that is constructively combined at a receiver. CJT may include beamforming with antennas that are not colocated and that correspond to different TRPs. CJT may improve the signal power and spatial diversity of communications in an NR network.

The UE 120 may measure CSI-RSs and transmit a CSI report that indicates CSI, such as a precoding matrix indicator (PMI). A PMI is a matrix that represents how data is transformed to antenna ports. The CSI report may include a codebook, which is a set of precoders or one or more PMIs. A Type-I codebook may include predefined matrices. A Type-II codebook may include a more detailed CSI report for multi-user MIMO and may include a group of beams. CSI acquisition may be enhanced for CJT for multiple TRPs (e.g., up to 4 TRPs). An enhanced Type-II codebook (eType-II codebook) may be eType-II codebook structure can be generalized as $W = W_1 \times \tilde{W}_2 \times W_f^H$, where the precoder for a certain layer on $N_3$ subbands is written as $$W = W_1 \times \tilde{W}_2 \times W_f^H = \begin{pmatrix} \sum_{i=0}^{L-1} \sum_{m=0}^{M-1} v_{m_1^{(i)}, m_2^{(i)}} c_{i,m} \cdot f_{m_3^{(m)}}^H \\ \sum_{i=0}^{L-1} \sum_{m=0}^{M-1} v_{m_1^{(i)}, m_2^{(i)}} c_{i+L,m} \cdot f_{m_3^{(m)}}^H \end{pmatrix},$$

where $C_{i,m,l}$ is the combination coefficient for the i-th spatial basis (beam), m-th frequency basis, and $\tilde{W}_2$ is the 2 L×M matrix containing all coefficients, such as $$v_{m_1^{(i)}, m_2^{(i)}}$$

is a $N_t \times 1$ spatial domain (SD) basis, $W_1$ is an $N_t \times 2L$ matrix containing all SD bases, and $f_{m_3^{(m)}}^H$ is a $1 \times N_3$ FD basis; $W_f^H$ is a $M \times N_3$ matrix containing all FD bases. L may be a spatial domain basis, such as a beam configuration or TRPs. M may be a frequency domain basis. The eType-II extension to CJT may apply separately on TRPs then combine with co-phasing:

$$W = \begin{bmatrix} W(1) \\ \varphi(2) \cdot W(2) \end{bmatrix},$$

where W(1) and W(2) are the associated eType-II precoders for TRP1 and TRP2, and $\varphi(2)$ is the scaler (or vector for different subbands) for co-phasing. The eType-II precoders may apply jointly across TRPs, where $$W = \begin{bmatrix} W(1) \\ W(2) \end{bmatrix},$$

and the difference here is that W(1) and W(2) are jointly calculated.

For eType-II CSI, parameters may include an SD basis number configuration represented as #SD: L={2,4,6}. A frequency domain basis number may be represented as $$\#FD: M_1 = M_2 = \left\lceil p_1 \times \frac{N_3}{R} \right\rceil$$

and $$M_3 = M_4 = \left\lceil p_3 \times \frac{N_3}{R} \right\rceil.$$

Coefficients may include amplitude scaling factors (p) and beta offset factors (β). A non-zero coefficient (NZC) may be represented as #NZC: $K_0 = \lceil \beta \times 2LM_1 \rceil$. A network entity may use an RRC message to configures a (1 out of 8) combination of (L, $p_1$, $p_3$, β).

For eType-II with CJT, further design considerations may be necessary for multiple TRPs. If multiple TRPs are supported, such as up to 4 TRPs, the UE may jointly report a PMI for all TRPs, and the UE may be expected to indicate a selection hypothesis. Different TRPs may be with a different number for a spatial domain basis (L) or a frequency domain basis (M), in order to indicate the channel condition of different TRPs, while balancing the feedback overhead (e.g., bit-map for coefficient indication, coefficient feedback). Different codebooks may need to be supported based on, for example, co-phasing across different TRPs (where coefficients for TRPs are calculated independently). Codebooks may be jointly calculated and reported across TRPs.

For NCJT that is based on spatial domain multiplexing (SDM), data is precoded separately on different TRPs. For example, precoder A is precoded for one TRP, and precoder B is precoded for a separate TRP. This may be expressed as:

$$\begin{bmatrix} V_A & 0 \\ 0 & V_B \end{bmatrix} \begin{bmatrix} X_A \\ X_B \end{bmatrix} = \begin{bmatrix} V_A X_A \\ V_B X_B \end{bmatrix},$$

where letters not in bold are for precoder A and data for a first TRP, and letters in bold are for precoder B and data for a second TRP. For example, precoder ($N_t^{TRP} \times RI^{TRP}$) $V_A$: 4×1, $V_B$: 4×2 may indicate a precoder for a specific TRP and rank (indicated by rank indicator (RI)). Data ($RI^{TRP} \times 1$) $X_A$: 1×1, $X_B$: 2×1 may indicate data by TRP and RI.

For CJT, data is precoded jointly on different TRPs. This may be expressed, for example as:

$$\begin{bmatrix} V_A \\ V_B \end{bmatrix} \cdot X = \begin{bmatrix} V_A X \\ V_B X \end{bmatrix},$$

precoder ($N_t^{TRP} \times RI^{CJT}$) $V_A$: 4×2, $V_B$: 4×2, and data ($RI^{CJT} \times 1$) X: 2×1. Reference number 702 shows joint precoding for multiple TRPs rather than separate precoding as shown for NCJT. Reference number 704 shows 2 layers that are jointly precoded. Reference number 706 shows a precoder for one layer of an eType-II codebook structure that is generalized as $W = W_1 \times \tilde{W}_2 \times W_f^H$.

For a 3GPP standard release 18 Type-II codebook refinement for high or medium UE mobility velocities, a UE may support a codebook structure where $N_4$ (size of the codebook in the time domain) is configured by the network entity via higher-layer signaling. For $N_4=1$, a DD basis is the identity (no DD compression) that reuses the legacy $W_1$, $\tilde{W}_2$, and $W_f$ (e.g., $W_1 \tilde{W}_2 (W_f)^H$). At higher UE velocities, channel variation over the time domain is significant. Without accounting for this variation in UE mobility scenarios, the codebook may become inaccurate. Inaccurate feedback may degrade communications, which wastes power, processing resources, and signaling resources.

For $N_4=1$, a DD orthogonal DFT basis commonly selected for all spatial domain (SD) and frequency domain (FD) bases may reuse the legacy $W_1$ and $W_f$, where the codebook is represented as $W_1 \tilde{W}_2 (W_f \otimes W_d)^H$. $W_1$ represents a spatial aspect, $\tilde{W}_2$ represents codebook coefficients, $W_f$ represents the FD, and now $W_d$ represents the TD or DD basis. In such a scenario, only Q (denoting the quantity of selected DD basis vectors)>1 may be allowed.

In typical UE operation, coverage may be limited to a single TRP, and mobility may be restricted such that legacy CSI can ensure reliable communication. A legacy codebook (e.g., Release 17 codebook, codebook earlier than Release 17) may be characterized as a codebook that is for a single TRP and that does not include a TD or DD basis. A Release 18 codebook (non-legacy codebook) may be characterized as a codebook that is for multiple TRPs, includes a TD or DD basis, or both. Release 18 codebook enhancements can involve higher computation and processing at the UE side, in addition to higher measurement and reporting resource overhead. Benefits from Release 18 refinement can be found mainly in the high Doppler scenario and in mTRP CJT operation, where the UE is in the coverage area of multiple TRPs. If a UE does not need to use a Release 18 codebook (e.g., single TRP, low mobility), it is a waste of power, processing resources, and signaling resources to use the Release 18 codebook.

In addition, different alternative choices for the DD or TD bases ($W_d$) have different advantages or disadvantages. Overhead for non-identity bases (e.g., DFT, discrete cosine transform (DCT)) is lower due to better compression (but higher complexity). An identity basis is suitable when channel variation is abrupt and less predictable. A basis function may be tailored to different operation scenarios to leverage higher accuracy and overhead tradeoff.

As indicated above, FIG. 7 is provided as an example. Other examples may differ from what is described with regard to FIG. 7.

Figure 8:
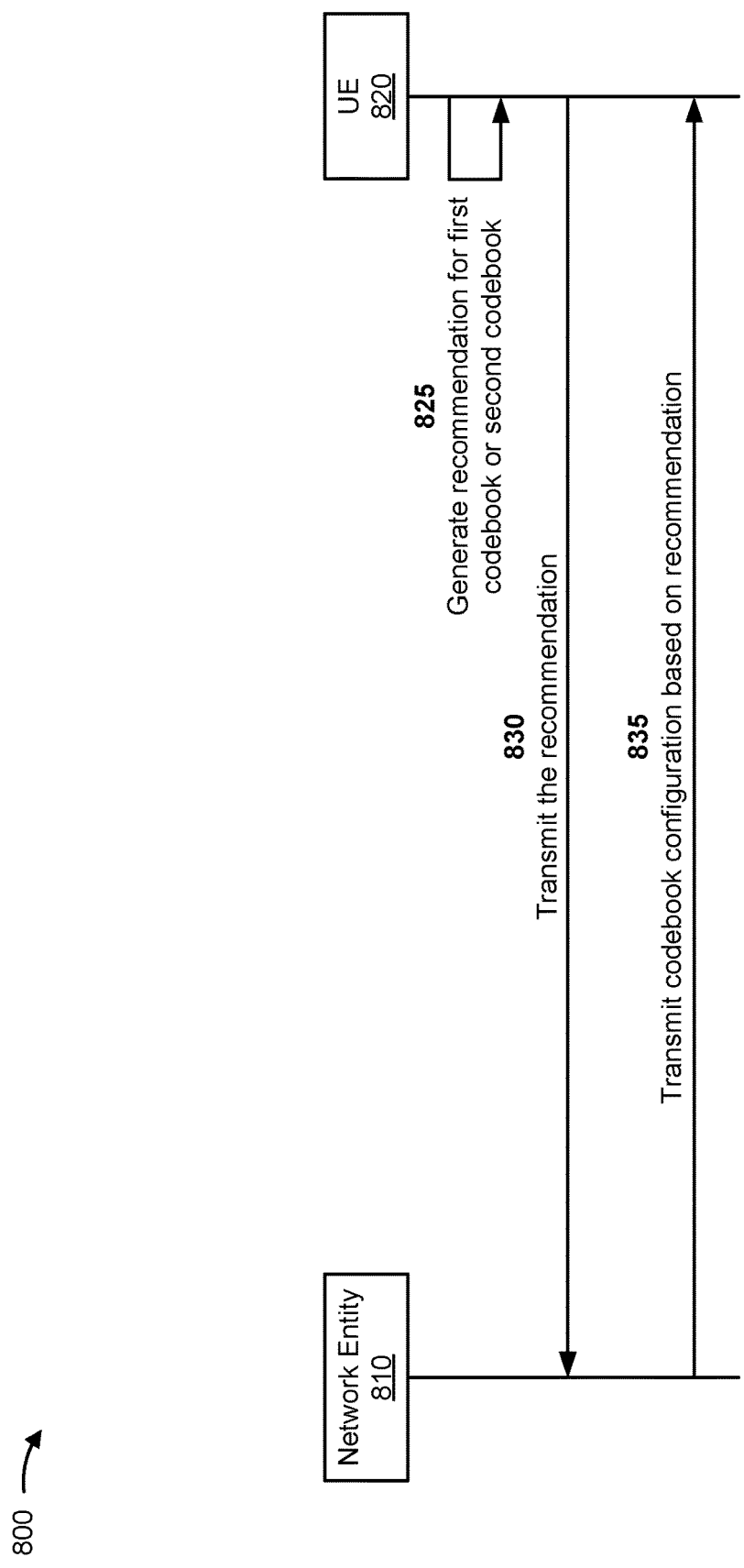
FIG. 8 is a diagram illustrating an example of selecting a codebook, in accordance with the present disclosure.

FIG. 8 is a diagram illustrating an example 800 of selecting a codebook, in accordance with the present disclosure. Example 800 shows a network entity 810 (e.g., network node 110) and a UE 820 (e.g., UE 120) that may communicate with each other via a wireless network (e.g., wireless network 100). The network entity 810 may control or operate with one or more TRPs.

According to various aspects described herein, the UE 820 may dynamically switch between a first codebook (e.g., a Release 17 codebook that is for a single TRP and that does not include a TD or DD basis) and a second codebook (e.g., a Release 18 codebook that is for multiple TRPs, that includes a TD or DD basis, or both). For example, the UE 820 may generate a recommendation by selecting the first codebook or the second codebook, as shown by reference number 825. As shown by reference number 830, the UE 820 may transmit the recommendation. As shown by reference number 835, the network entity 810 may transmit a codebook configuration that is based at least in part on the recommendation. The network entity 810 may accept the recommendation or reject the recommendation and select a different codebook than recommended. By providing a recommendation, the UE 820 may have more flexibility to select a codebook (e.g., Release 17 codebook or Release 18 codebook) that is appropriate to conditions or to a UE status. As a result, the UE 820 conserves power, processing resource, and signaling resources if a Release 18 codebook is not necessary. The UE 820 may use the Release 18 codebook to improve CSI feedback and improve communications, which also conserves power, processing resources, and signaling resources that would otherwise be wasted with degraded communications and retransmissions.

For example, the UE 820 may request that network entity 810 switch between a Release 18 codebook and a Release 17 codebook based at least in part on UE side conditions, or conditions at the UE 820. A UE side condition may include a channel time correlation measurement, such as a measurement of a downlink reference signal (e.g., a CSI-RS or a tracking reference signal (TRS)). The measurement may indicate a time difference or a time variation of the channel. A side condition may include a Doppler measurement, which may include a time difference or variation based at least in part on UE mobility or other sensors (e.g., proximity, radar, lidar) of the UE 820. The side condition may include RSRP measurements or signal-to-interference-plus-noise ratio (SINR) measurements from multiple TRPs.

In some aspects, the UE 820 may select a Release 18 codebook based at least in part on a determination that use of an existing Release 17 codebook is causing a throughput loss or failing to meet a block error rate (BLER) threshold (e.g., maximum BLER). Rather than making hybrid automatic repeat request (HARQ) or CQI adjustments, after communications are failing to improve with such corrections, the UE 820 may request to switch to the Release 18 codebook.

In some aspects, the UE 820 may select a Release 17 codebook or a Release 18 codebook based at least in part on a UE battery state or a data application quality of service (QOS) requirement. For example, the UE 820 may switch from a Release 18 codebook to a legacy codebook (e.g., a Release 17 codebook or an earlier-release codebook). In some aspects, the UE 820 may transmit a recommendation indicating the codebook selection in an explicit message, such as in a physical uplink channel message.

Alternatively, in some aspects, the recommendation may be an implicit message. The UE 820 may adjust signaling or adjust one or more parameters in existing signaling that is used by the UE 820 such that the network entity 810 interprets the adjustment as an indication of a recommendation to switch codebooks. For example, the UE 820 may indicate a recommendation by transmitting multiple negative acknowledgements (NACKs) that are interpreted by the network entity 810 as an indication to switch codebooks. In some aspects, the UE 820 may transmit an indication of a preferred codebook that is different than configured by the network entity 810. Other parameter adjustments may include a pattern of NACKs. For example, the UE 810 may transmit a NACK at slot/time n1, n2, n3, . . . nK. In some aspects, the UE 820 may transmit an ACK or NACK in specified or configured resources. The UE 802 may also multiplex an additional information field in the existing ACK/NACK message.

As indicated above, FIG. 8 is provided as an example. Other examples may differ from what is described with regard to FIG. 8.

Figure 9:
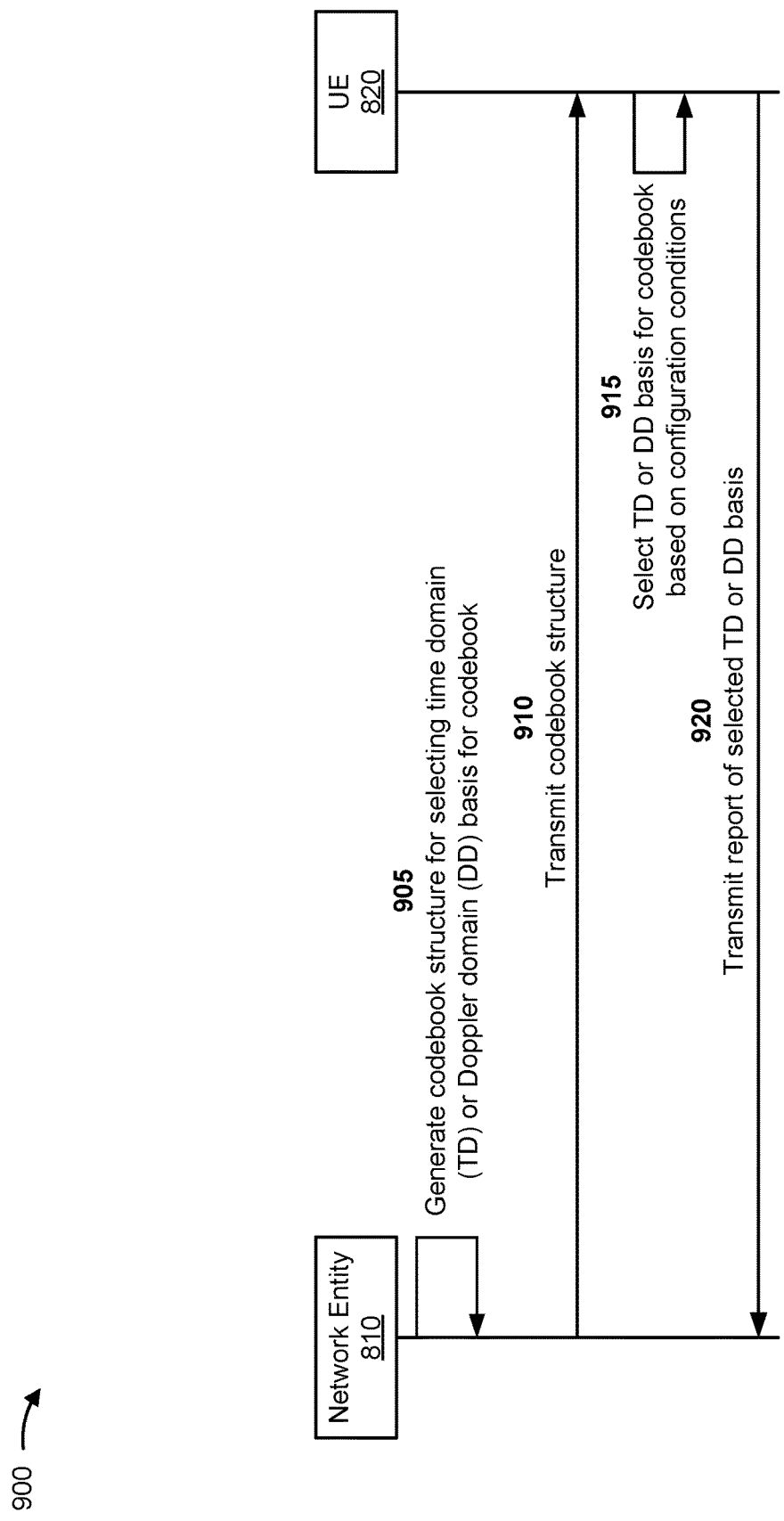
FIG. 9 is a diagram illustrating an example of codebook basis selection, in accordance with the present disclosure.

FIG. 9 is a diagram illustrating an example 900 of codebook basis selection, in accordance with the present disclosure.

In some aspects, the network entity 810 may configure an adaptive codebook structure where the UE 820 is able to select a TD or DD basis (or a TD or DD set of bases) for a codebook (e.g., a selected codebook) based at least in part on meeting certain configuration conditions. The conditions may be configured via radio resource control (RRC) messaging.

Example 900 shows use of a codebook structure for TD or DD basis selection. As shown by reference number 905, the network entity 810 may generate a codebook structure for selecting a TD or DD basis for a codebook. The codebook structure may indicate a codebook and/or conditions for selecting a TD or DD basis for the codebook. The UE 820 may select the TD or DD basis based at least in part on one or more configuration conditions.

In some aspects, a configuration condition may include an offset between a CSI measurement or report instance and a codebook application slot (when the codebook is applied). The configuration condition may include a codebook size (e.g., $N_4$) in the TD/DD. The configuration condition may include a channel correlation time. The configuration condition may include a UE-perceived Doppler profile. The configuration condition may include a report overhead or a resource configuration. The configuration condition may include a QoS requirement.

In some aspects, a configuration may include a network entity 810 preference order or a UE 820 preference order for TD or DD basis selection. For example, a preference order may include a list of TD or DD bases that the UE 820 may select from, in order. In some aspects, the order may be based at least in part on a preference of the respective nodes. For example, the UE 820 may prefer a certain basis set at a given time based at least in part on its available resources (e.g., hardware, software, computation, memory, power). The preference may change over time as the availability of the resources changes. Similarly, the network entity 810 may have a preference based at least in part on its load and/or traffic.

As shown by reference number 910, the network entity 810 may transmit the codebook structure. As shown by reference number 915, the UE 820 may select a TD or DD basis for a codebook based at least in part on one or more configuration conditions. This may include comparing a current condition (e.g., traffic, channel, UE status) and a configuration condition. The UE 820 may select one or more TD or DD bases ($W_d$) based at least in part on a result of the comparison. In some aspects, the UE 820 may transmit a report of the selected TD or DD basis, as shown by reference number 920.

By enabling the UE 820 to select a TD or DD basis for a codebook, the UE 820 may select a choice of TD or DD basis for the codebook that uses an advantage or avoids a disadvantage of another TD or DD basis. As a result, the codebook is able to be more accurate and/or more efficient. This improves communications and conserves power, processing resources, and signaling resources.

As indicated above, FIG. 9 is provided as an example. Other examples may differ from what is described with regard to FIG. 9.

Figure 10:
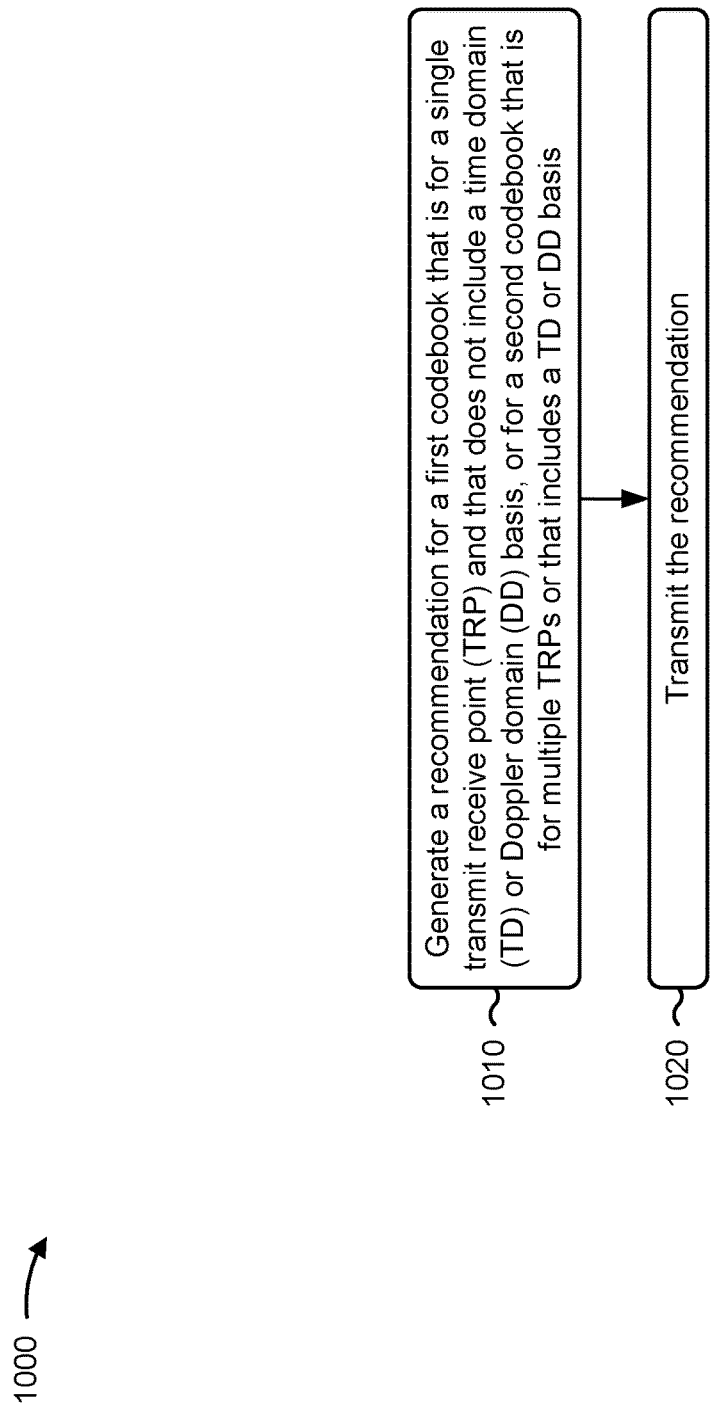
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120, UE 820) performs operations associated with codebook selection.

As shown in FIG. 10, in some aspects, process 1000 may include generating a recommendation for a first codebook (e.g., Release 17 codebook) that is for a single TRP and that does not include a TD or DD basis, or for a second codebook (e.g., Release 18 codebook) that is for multiple TRPs or that includes a TD or DD basis (or both) (block 1010). For example, the UE (e.g., using communication manager 1406, depicted in FIG. 14) may generate a recommendation for a first codebook that is for a single TRP and that does not include a TD or DD basis, or for a second codebook that is for multiple TRPs or that includes a TD or DD basis (or both), as described above.

As further shown in FIG. 10, in some aspects, process 1000 may include transmitting the recommendation (block 1020). For example, the UE (e.g., using transmission component 1404 and/or communication manager 1406, depicted in FIG. 14) may transmit the recommendation, as described above.

Process 1000 may include additional aspects, such as any single aspect or any combination of aspects described below and/or in connection with one or more other processes described elsewhere herein.

In a first aspect, the generating the recommendation includes selecting the first codebook or the second codebook based at least in part on a channel time correlation measurement.

In a second aspect, alone or in combination with the first aspect, the generating the recommendation includes selecting the first codebook or the second codebook based at least in part on a Doppler measurement.

In a third aspect, alone or in combination with one or more of the first and second aspects, the Doppler measurement is based at least in part on sensor information from one or more sensors of the UE.

In a fourth aspect, alone or in combination with one or more of the first through third aspects, the generating the recommendation includes selecting the first codebook or the second codebook based at least in part on a reference signal received power measurements from multiple TRPs.

In a fifth aspect, alone or in combination with one or more of the first through fourth aspects, the generating the recommendation includes selecting the first codebook or the second codebook based at least in part on an SINR measurement from multiple TRPs.

In a sixth aspect, alone or in combination with one or more of the first through fifth aspects, the generating the recommendation includes selecting the second codebook based at least in part on a BLER for the first codebook satisfying a BLER threshold.

In a seventh aspect, alone or in combination with one or more of the first through sixth aspects, the generating the recommendation includes selecting the second codebook based at least in part on a throughput loss for the first codebook satisfying a loss threshold.

In an eighth aspect, alone or in combination with one or more of the first through seventh aspects, the generating the recommendation includes selecting the first codebook or the second codebook based at least in part on a power status of the UE or a processing status of the UE.

In a ninth aspect, alone or in combination with one or more of the first through eighth aspects, the generating the recommendation includes selecting the first codebook or the second codebook based at least in part on a quality of service requirement.

In a tenth aspect, alone or in combination with one or more of the first through ninth aspects, the recommendation is an explicit message indicating a selection of the first codebook or the second codebook.

In an eleventh aspect, alone or in combination with one or more of the first through tenth aspects, the transmitting the recommendation includes transmitting a threshold quantity of NACKs.

In a twelfth aspect, alone or in combination with one or more of the first through eleventh aspects, the transmitting the recommendation includes transmitting a preferred codebook that differs from a codebook configuration.

In a thirteenth aspect, alone or in combination with one or more of the first through twelfth aspects, the transmitting the recommendation includes adjusting signaling to indicate a request for a codebook switch.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
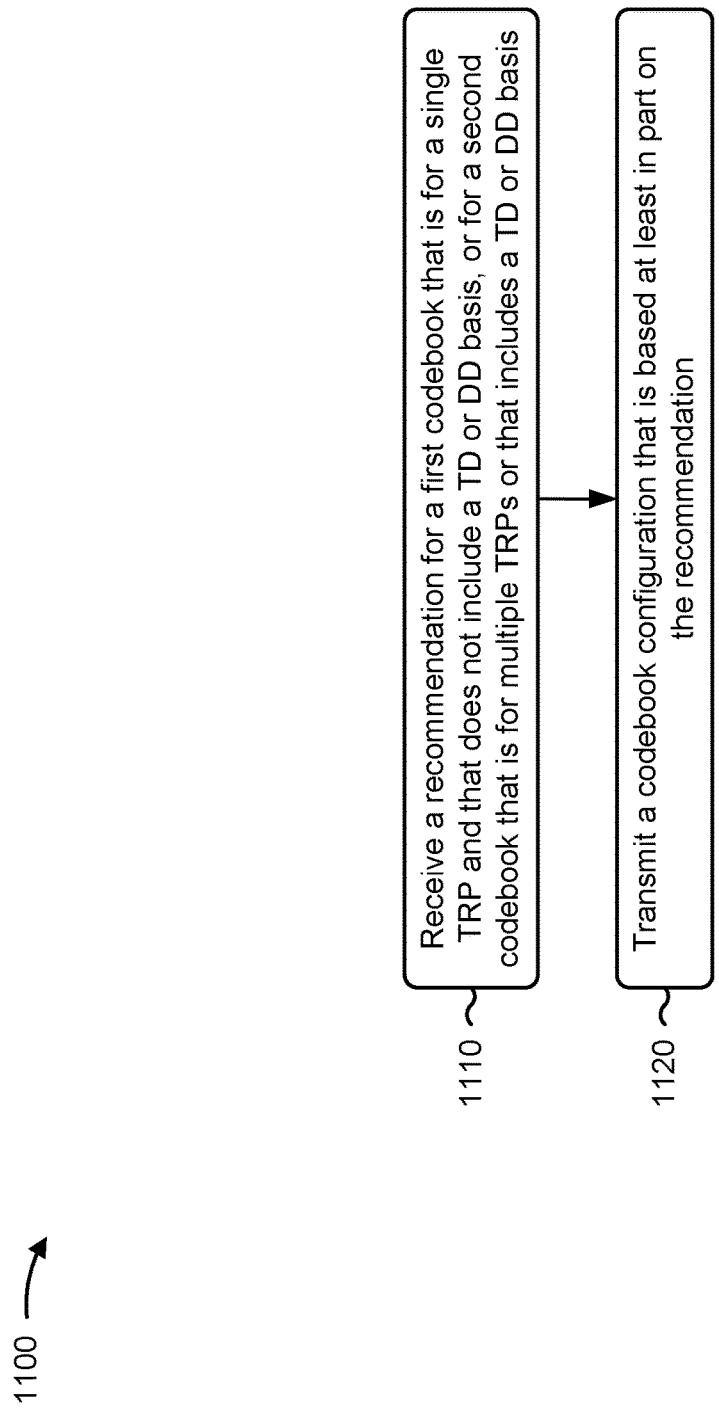
FIG. 11 is a diagram illustrating an example process performed, for example, by a network entity, in accordance with the present disclosure.

FIG. 11 is a diagram illustrating an example process 1100 performed, for example, by a network entity, in accordance with the present disclosure. Example process 1100 is an example where the network entity (e.g., network node 110, network entity 810) performs operations associated with codebook selection.

As shown in FIG. 11, in some aspects, process 1100 may include receiving a recommendation for a first codebook that is for a single TRP and that does not include a TD or DD basis, or for a second codebook that is for multiple TRPs or that includes a TD or DD basis (block 1110). For example, the network entity (e.g., using reception component 1402 and/or communication manager 1406 depicted in FIG. 14) may receive a recommendation for a first codebook that is for a single TRP and that does not include a TD or DD basis, or for a second codebook that is for multiple TRPs or that includes a TD or DD basis, as described above.

As further shown in FIG. 11, in some aspects, process 1100 may include transmitting a codebook configuration that is based at least in part on the recommendation (block 1120). For example, the network entity (e.g., using transmission component 1404 and/or communication manager 1406 depicted in FIG. 14) may transmit a codebook configuration that is based at least in part on the recommendation, as described above.

Process 1100 may include additional aspects, such as any single aspect or any combination of aspects described below and/or in connection with one or more other processes described elsewhere herein.

In a first aspect, the recommendation includes an explicit physical uplink control channel message indicating a selection of the first codebook or the second codebook.

In a second aspect, alone or in combination with the first aspect, the receiving the recommendation includes receiving a threshold quantity of NACKs.

In a third aspect, alone or in combination with one or more of the first and second aspects, the receiving the recommendation includes receiving a preferred codebook that differs from a codebook configuration.

In a fourth aspect, alone or in combination with one or more of the first through third aspects, the receiving the recommendation includes receiving signaling that is adjusted to indicate a request for a codebook switch.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
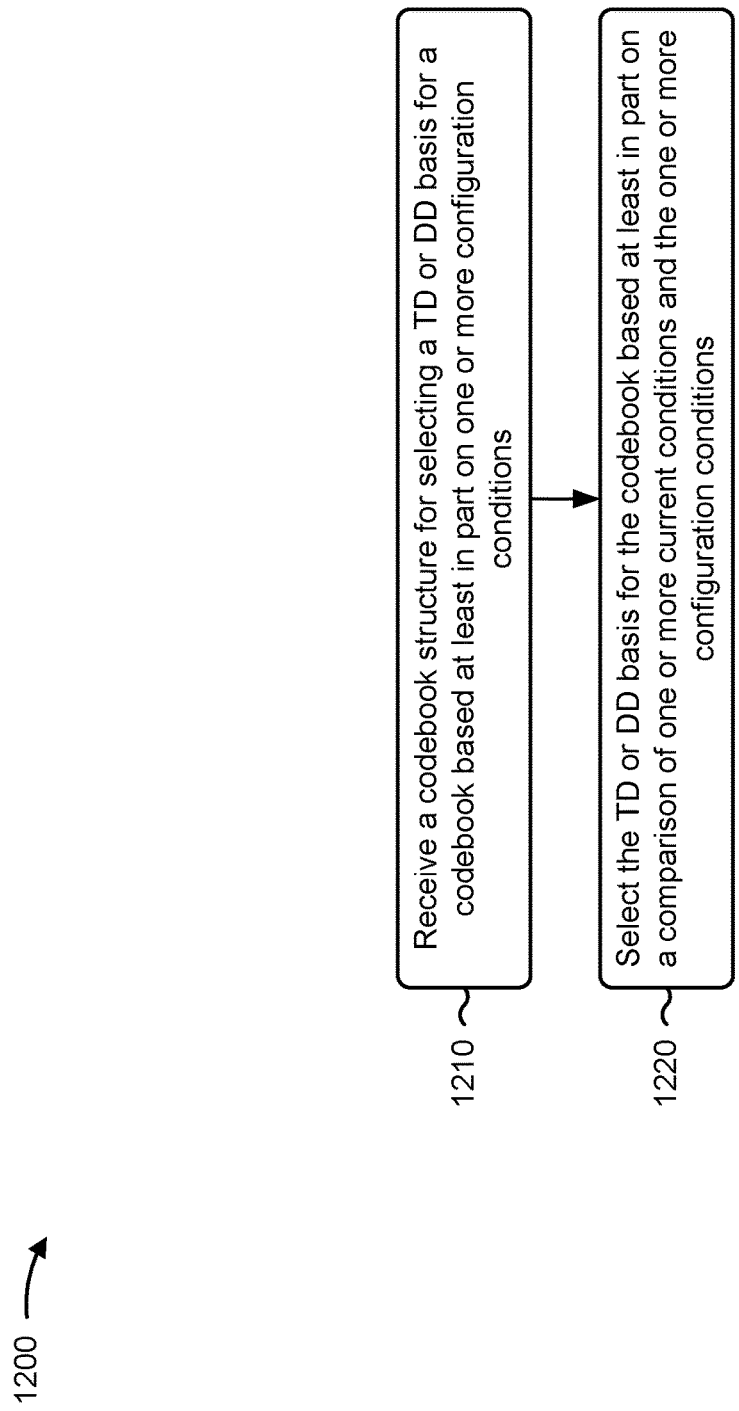
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., UE 120, UE 820) performs operations associated with TD or DD basis selection.

As shown in FIG. 12, in some aspects, process 1200 may include receiving a codebook structure for selecting a TD or DD basis for a codebook based at least in part on one or more configuration conditions (block 1210). For example, the UE (e.g., using reception component 1402 and/or communication manager 1406, depicted in FIG. 14) may receive a codebook structure for selecting a TD or DD basis for a codebook based at least in part on one or more configuration conditions, as described above.

As further shown in FIG. 12, in some aspects, process 1200 may include selecting the TD or DD basis for the codebook based at least in part on a comparison of one or more current conditions and the one or more configuration conditions (block 1220). For example, the UE (e.g., using communication manager 1406, depicted in FIG. 14) may select the TD or DD basis for the codebook based at least in part on a comparison of one or more current conditions and the one or more configuration conditions, as described above.

Process 1200 may include additional aspects, such as any single aspect or any combination of aspects described below and/or in connection with one or more other processes described elsewhere herein.

In a first aspect, the one or more configuration conditions include an offset between a CSI measurement or reporting instance and a codebook application slot.

In a second aspect, alone or in combination with the first aspect, the one or more configuration conditions include a codebook size in the TD or DD basis.

In a third aspect, alone or in combination with one or more of the first and second aspects, the one or more configuration conditions include a channel correlation time.

In a fourth aspect, alone or in combination with one or more of the first through third aspects, the one or more configuration conditions include a UE-perceived Doppler profile.

In a fifth aspect, alone or in combination with one or more of the first through fourth aspects, the one or more configuration conditions include a report overhead configuration or a resource configuration.

In a sixth aspect, alone or in combination with one or more of the first through fifth aspects, the one or more configuration conditions include a QoS requirement.

In a seventh aspect, alone or in combination with one or more of the first through sixth aspects, the codebook structure indicates a preferred preference order for the TD or DD basis or a codebook structure preferred by the UE.

In an eighth aspect, alone or in combination with one or more of the first through seventh aspects, process 1200 includes transmitting a report of the selected TD or DD basis for the codebook.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
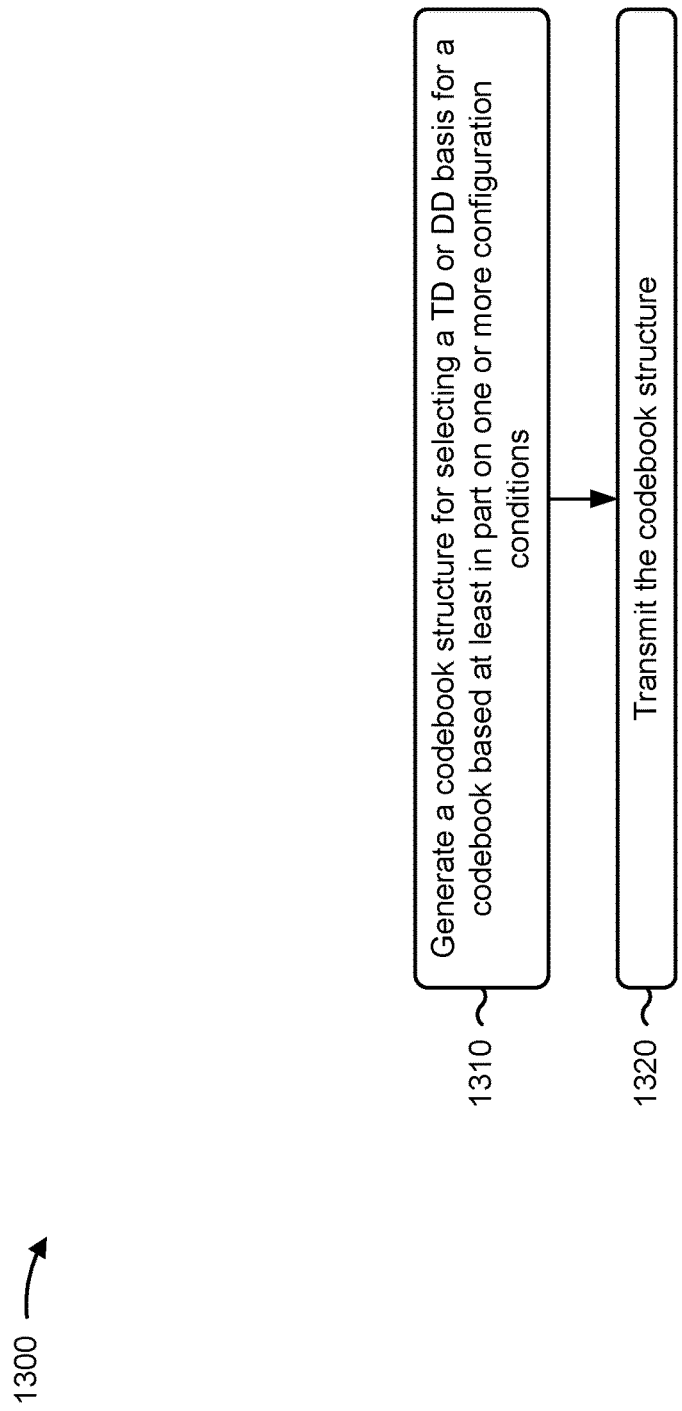
FIG. 13 is a diagram illustrating an example process performed, for example, by a network entity, in accordance with the present disclosure.

FIG. 13 is a diagram illustrating an example process 1300 performed, for example, by a network entity, in accordance with the present disclosure. Example process 1300 is an example where the network entity (e.g., network node 110, network entity 810) performs operations associated with codebook selection.

As shown in FIG. 13, in some aspects, process 1300 may include generating a codebook structure for selecting a TD or DD basis for a codebook based at least in part on one or more configuration conditions (block 1310). For example, the network entity (e.g., using communication manager 1506 depicted in FIG. 15) may generate a codebook structure for selecting a TD or DD basis for a codebook based at least in part on one or more configuration conditions, as described above.

As further shown in FIG. 13, in some aspects, process 1300 may include transmitting the codebook structure (block 1320). For example, the network entity (e.g., using transmission component 1504 and/or communication manager 1506 depicted in FIG. 15) may transmit the codebook structure, as described above.

Process 1300 may include additional aspects, such as any single aspect or any combination of aspects described below and/or in connection with one or more other processes described elsewhere herein.

In one aspect, process 1300 includes receiving a report of a selected TD or DD basis that is associated with the codebook structure.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
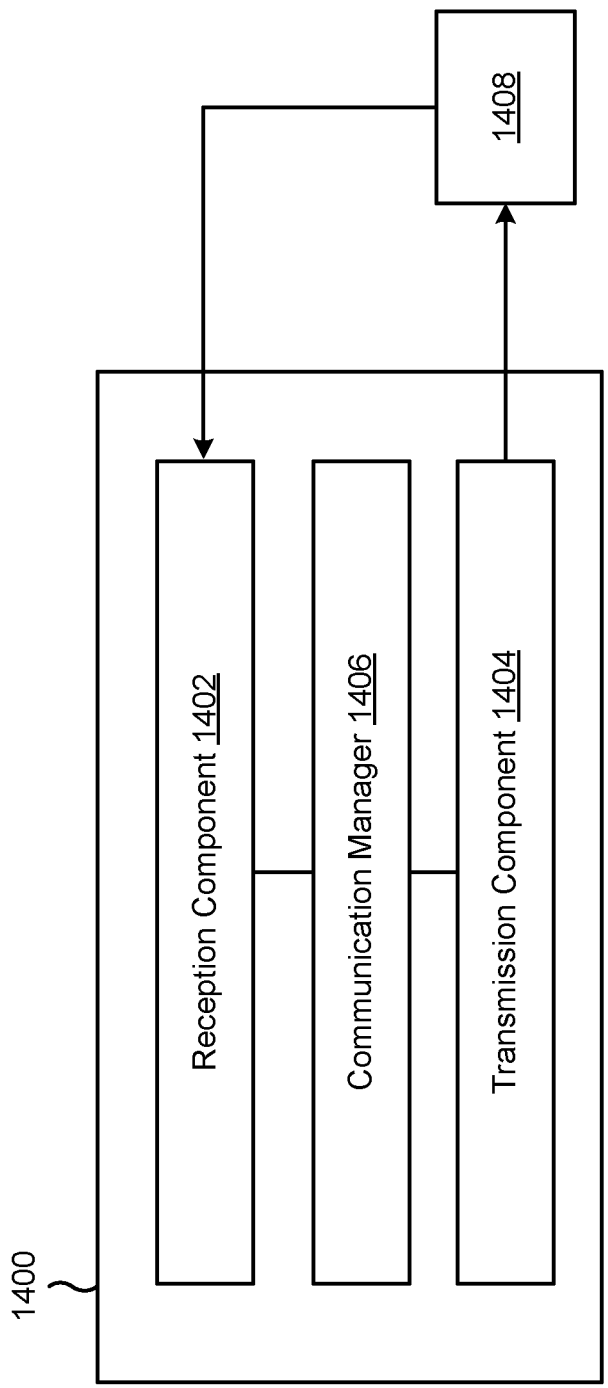
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a UE (e.g., UE 120, UE 820), or a UE may include the apparatus 1400. In some aspects, the apparatus 1400 includes a reception component 1402, a transmission component 1404, and/or a communication manager 1406, which may be in communication with one another (for example, via one or more buses and/or one or more other components). In some aspects, the communication manager 1406 is the communication manager 140 described in connection with FIG. 1. As shown, the apparatus 1400 may communicate with another apparatus 1408, such as a UE or a network node (such as a CU, a DU, an RU, or a base station), using the reception component 1402 and the transmission component 1404.

In some aspects, the apparatus 1400 may be configured to perform one or more operations described herein in connection with FIGS. 1-9. Additionally, or alternatively, the apparatus 1400 may be configured to perform one or more processes described herein, such as process 1000 of FIG. 10, process 1200 of FIG. 12, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1408. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1408. In some aspects, one or more other components of the apparatus 1400 may generate communications and may provide the generated communications to the transmission component 1404 for transmission to the apparatus 1408. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The communication manager 1406 may support operations of the reception component 1402 and/or the transmission component 1404. For example, the communication manager 1406 may receive information associated with configuring reception of communications by the reception component 1402 and/or transmission of communications by the transmission component 1404. Additionally, or alternatively, the communication manager 1406 may generate and/or provide control information to the reception component 1402 and/or the transmission component 1404 to control reception and/or transmission of communications.

In some aspects, the communication manager 1406 may generate a recommendation for a first codebook that is for a single TRP and that does not include a TD or DD basis, or for a second codebook that is for multiple TRPs or that includes a TD or DD basis. The transmission component 1404 may transmit the recommendation.

In some aspects, the reception component 1402 may receive a codebook structure for selecting a TD or DD basis for a codebook based at least in part on one or more configuration conditions. The communication manager 1406 may select the TD or DD basis for the codebook based at least in part on a comparison of one or more current conditions and the one or more configuration conditions. The transmission component 1404 may transmit a report of the selected TD or DD basis for the codebook.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
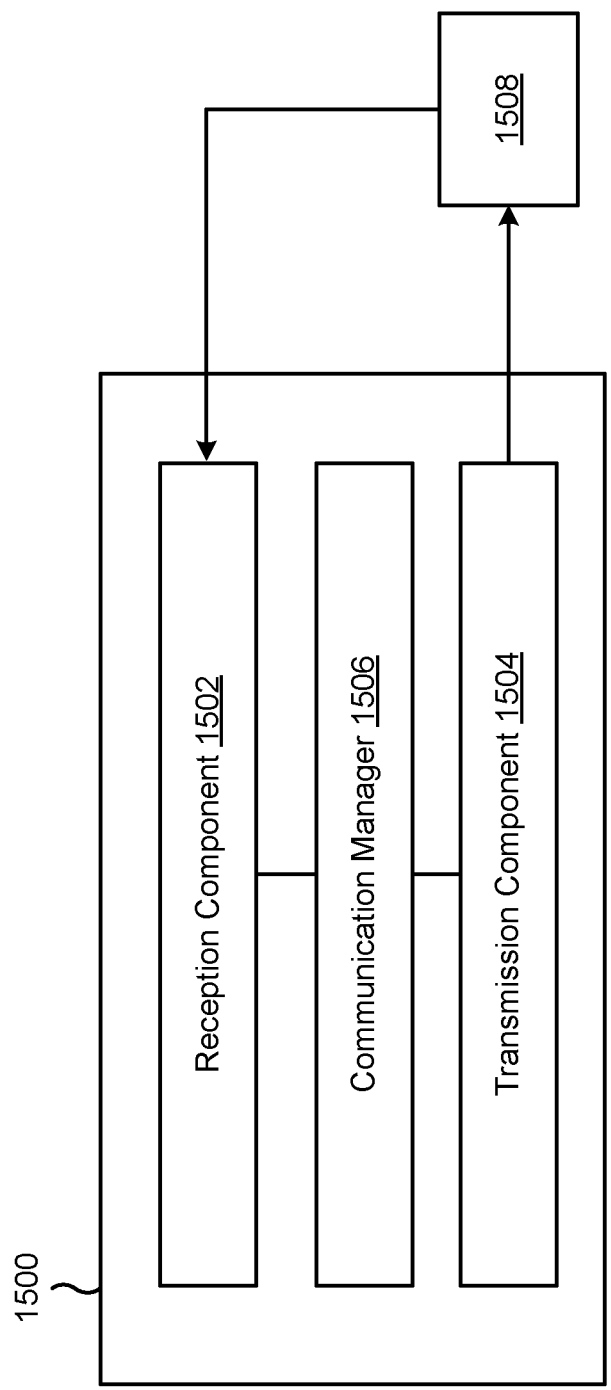
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a network entity (e.g., network node 110, network entity 810), or a network entity may include the apparatus 1500. In some aspects, the apparatus 1500 includes a reception component 1502, a transmission component 1504, and/or a communication manager 1506, which may be in communication with one another (for example, via one or more buses and/or one or more other components). In some aspects, the communication manager 1506 is the communication manager 150 described in connection with FIG. 1. As shown, the apparatus 1500 may communicate with another apparatus 1508, such as a UE or a network node (such as a CU, a DU, an RU, or a base station), using the reception component 1502 and the transmission component 1504.

In some aspects, the apparatus 1500 may be configured to perform one or more operations described herein in connection with FIGS. 1-9. Additionally, or alternatively, the apparatus 1500 may be configured to perform one or more processes described herein, such as process 1100 of FIG. 11, process 1300 of FIG. 13, or a combination thereof. In some aspects, the apparatus 1500 and/or one or more components shown in FIG. 15 may include one or more components of the network entity described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1508. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network entity described in connection with FIG. 2.

The transmission component 1504 may transmit communications, such as reference signals, control information, data communications, or a combination thereof, to the apparatus 1508. In some aspects, one or more other components of the apparatus 1500 may generate communications and may provide the generated communications to the transmission component 1504 for transmission to the apparatus 1508. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1508. In some aspects, the transmission component 1504 may include one or more antennas, a modem, a modulator, a transmit MIMO processor, a transmit processor, a controller/processor, a memory, or a combination thereof, of the network entity described in connection with FIG. 2. In some aspects, the transmission component 1504 may be co-located with the reception component 1502 in a transceiver.

The communication manager 1506 may support operations of the reception component 1502 and/or the transmission component 1504. For example, the communication manager 1506 may receive information associated with configuring reception of communications by the reception component 1502 and/or transmission of communications by the transmission component 1504. Additionally, or alternatively, the communication manager 1506 may generate and/or provide control information to the reception component 1502 and/or the transmission component 1504 to control reception and/or transmission of communications.

In some aspects, the reception component 1502 may receive a recommendation for a first codebook that is for a single TRP and that does not include a TD or DD basis, or for a second codebook that is for multiple TRPs or that includes a TD or DD basis. The transmission component 1504 may transmit a codebook configuration that is based at least in part on the recommendation.

In some aspects, the communication manager 1506 may generate a codebook structure for selecting a TD or DD basis for a codebook based at least in part on one or more configuration conditions. The transmission component 1504 may transmit the codebook structure. The reception component 1502 may receive a report of a selected TD or DD basis that is associated with the codebook structure.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: generating a recommendation for a first codebook that is for a single transmit receive point (TRP) and that does not include a time domain (TD) or Doppler domain (DD) basis, or for a second codebook that is for multiple TRPs or that includes a TD or DD basis; and transmitting the recommendation.

Aspect 2: The method of Aspect 1, wherein the generating the recommendation includes selecting the first codebook or the second codebook based at least in part on a channel time correlation measurement.

Aspect 3: The method of any of Aspects 1-2, wherein the generating the recommendation includes selecting the first codebook or the second codebook based at least in part on a Doppler measurement.

Aspect 4: The method of Aspect 3, wherein the Doppler measurement is based at least in part on sensor information from one or more sensors of the UE.

Aspect 5: The method of any of Aspects 1-4, wherein the generating the recommendation includes selecting the first codebook or the second codebook based at least in part on a reference signal received power measurements from multiple TRPs.

Aspect 6: The method of any of Aspects 1-5, wherein the generating the recommendation includes selecting the first codebook or the second codebook based at least in part on a signal-to-interference-plus-noise ratio measurement from multiple TRPs.

Aspect 7: The method of any of Aspects 1-6, wherein the generating the recommendation includes selecting the second codebook based at least in part on a block error rate (BLER) for the first codebook satisfying a BLER threshold.

Aspect 8: The method of any of Aspects 1-7, wherein the generating the recommendation includes selecting the second codebook based at least in part on a throughput loss for the first codebook satisfying a loss threshold.

Aspect 9: The method of any of Aspects 1-8, wherein the generating the recommendation includes selecting the first codebook or the second codebook based at least in part on a power status of the UE or a processing status of the UE.

Aspect 10: The method of any of Aspects 1-9, wherein the generating the recommendation includes selecting the first codebook or the second codebook based at least in part on a quality of service requirement.

Aspect 11: The method of any of Aspects 1-10, wherein the recommendation is an explicit message indicating a selection of the first codebook or the second codebook.

Aspect 12: The method of any of Aspects 1-11, wherein the transmitting the recommendation includes transmitting a threshold quantity of negative acknowledgements.

Aspect 13: The method of any of Aspects 1-12, wherein the transmitting the recommendation includes transmitting a preferred codebook that differs from a codebook configuration.

Aspect 14: The method of any of Aspects 1-13, wherein the transmitting the recommendation includes adjusting signaling to indicate a request for a codebook switch.

Aspect 15: A method of wireless communication performed by a network entity, comprising: receiving a recommendation for a first codebook that is for a single transmit receive point (TRP) and that does not include a time domain (TD) or Doppler domain (DD) basis, or for a second codebook that is for multiple TRPs or that includes a TD or DD basis; and transmitting a codebook configuration that is based at least in part on the recommendation.

Aspect 16: The method of Aspect 15, wherein the recommendation includes an explicit physical uplink control channel message indicating a selection of the first codebook or the second codebook.

Aspect 17: The method of any of Aspects 15-16, wherein the receiving the recommendation includes receiving a threshold quantity of negative acknowledgements.

Aspect 18: The method of any of Aspects 15-17, wherein the receiving the recommendation includes receiving a preferred codebook that differs from a codebook configuration.

Aspect 19: The method of any of Aspects 15-18, wherein the receiving the recommendation includes receiving signaling that is adjusted to indicate a request for a codebook switch.

Aspect 20: A method of wireless communication performed by a user equipment (UE), comprising: receiving a codebook structure for selecting a time domain (TD) or Doppler domain (DD) basis for a codebook based at least in part on one or more configuration conditions; and selecting the TD or DD basis for the codebook based at least in part on a comparison of one or more current conditions and the one or more configuration conditions.

Aspect 21: The method of Aspect 20, wherein the one or more configuration conditions include an offset between a channel state information measurement or reporting instance and a codebook application slot.

Aspect 22: The method of any of Aspects 20-21, wherein the one or more configuration conditions include a codebook size in the TD or DD basis.

Aspect 23: The method of any of Aspects 20-22, wherein the one or more configuration conditions include a channel correlation time.

Aspect 24: The method of any of Aspects 20-23, wherein the one or more configuration conditions include a UE-perceived Doppler profile.

Aspect 25: The method of any of Aspects 20-24, wherein the one or more configuration conditions include a report overhead configuration or a resource configuration.

Aspect 26: The method of any of Aspects 20-25, wherein the one or more configuration conditions include a quality of service requirement.

Aspect 27: The method of any of Aspects 20-26, wherein the codebook structure indicates a preferred preference order for the TD or DD basis or a codebook structure preferred by the UE.

Aspect 28: The method of any of Aspects 20-27, further comprising transmitting a report of the selected TD or DD basis for the codebook.

Aspect 29: A method of wireless communication performed by a network entity, comprising: generating a codebook structure for selecting a time domain (TD) or Doppler domain (DD) basis for a codebook based at least in part on one or more configuration conditions; and transmitting the codebook structure.

Aspect 30: The method of Aspect 29, further comprising receiving a report of a selected TD or DD basis that is associated with the codebook structure.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled to the one or more memories, the one or more memories storing instructions configurable to be executed by the one or more processors to cause the UE to:
      generate a recommendation for a first codebook that is for a single transmit receive point (TRP) and that does not include a time domain (TD) or Doppler domain (DD) basis, or for a second codebook that is for multiple TRPs or that includes a TD or DD basis; and
      transmit the recommendation, wherein the recommendation is a message indicating a selection of the first codebook or the second codebook.

2. The UE of claim 1, wherein the instructions configurable to be executed, when generating the recommendation, are further executable by the one or more processors to cause the UE to, select the first codebook or the second codebook based at least in part on a channel time correlation measurement.

3. The UE of claim 1, wherein the instructions configurable to be executed, when generating the recommendation, are further executable by the one or more processors to cause the UE to, select the first codebook or the second codebook based at least in part on a Doppler measurement.

4. The UE of claim 3, wherein the Doppler measurement is based at least in part on sensor information from one or more sensors of the UE.

5. The UE of claim 1, wherein the instructions configurable to be executed, when generating the recommendation, are further executable by the one or more processors to cause the UE to, select the first codebook or the second codebook based at least in part on reference signal received power measurements from the multiple TRPs.

6. The UE of claim 1, wherein the instructions configurable to be executed, when generating the recommendation, are further executable by the one or more processors to cause the UE to select the first codebook or the second codebook based at least in part on signal-to-interference-plus-noise ratio measurements from the multiple TRPs.

7. The UE of claim 1, wherein the instructions configurable to be executed, when generating the recommendation, are further executable by the one or more processors to cause the UE to, select the second codebook based at least in part on a block error rate (BLER) for the first codebook satisfying a BLER threshold.

8. The UE of claim 1, wherein the instructions configurable to be executed, when generating the recommendation, are further executable by the one or more processors to cause the UE to, select the second codebook based at least in part on a throughput loss for the first codebook satisfying a loss threshold.

9. The UE of claim 1, wherein the instructions configurable to be executed, when generating the recommendation, are further executable by the one or more processors to cause the UE to, select the first codebook or the second codebook based at least in part on a power status of the UE or a processing status of the UE.

10. The UE of claim 1, wherein the instructions configurable to be executed, when generating the recommendation, are further executable by the one or more processors to cause the UE to, select the first codebook or the second codebook based at least in part on a quality of service requirement.

11. The UE of claim 1, wherein the message is an explicit physical uplink control channel message indicating the selection of the first codebook or the second codebook.

12. The UE of claim 1, wherein the instructions configurable to be executed, when transmitting the recommendation, are further executable by the one or more processors to cause the UE to, transmit a threshold quantity of negative acknowledgements.

13. The UE of claim 1, wherein the instructions configurable to be executed, when transmitting the recommendation, are further executable by the one or more processors to cause the UE to, transmit a preferred codebook that differs from a codebook configuration.

14. The UE of claim 1, wherein the instructions configurable to be executed, when transmitting the recommendation, are further executable by the one or more processors to cause the UE to, adjust signaling to indicate a request for a codebook switch.

15. A network entity for wireless communication, comprising:
one or more memories; and
one or more processors coupled to the one or more memories, the one or more memories storing instructions configurable to be executed by the one or more processors to cause the network entity to:
receive, from a user equipment (UE), a recommendation for a first codebook that is for a single transmit receive point (TRP) and that does not include a time domain (TD) or Doppler domain (DD) basis, or for a second codebook that is for multiple TRPs or that includes a TD or DD basis; and
transmit a codebook configuration that is based at least in part on the recommendation, wherein the recommendation is a message indicating a selection of the first codebook or the second codebook.

16. The network entity of claim 15, wherein the message includes an explicit physical uplink control channel message indicating the selection of the first codebook or the second codebook.

17. The network entity of claim 15, wherein the instructions configurable to be executed, when receiving the recommendation, are further executable by the one or more processors to cause the network entity to, receive a threshold quantity of negative acknowledgements.

18. The network entity of claim 15, wherein the instructions configurable to be executed, when receiving the recommendation, are further executable by the one or more processors to cause the network entity to, receive a preferred codebook that differs from the codebook configuration.

19. The network entity of claim 15, wherein the instructions configurable to be executed, when receiving the recommendation, are further executable by the one or more processors to cause the network entity to, receive signaling that is adjusted to indicate a request for a codebook switch.

20. A user equipment (UE) for wireless communication, comprising:
one or more memories; and
one or more processors coupled to the one or more memories, the one or more memories storing instructions configurable to be executed by the one or more processors to cause the UE to:
receive a codebook structure for selecting a time domain (TD) or Doppler domain (DD) basis for a codebook based at least in part on one or more configuration conditions; and
select the TD or DD basis for the codebook based at least in part on a comparison of one or more current conditions and the one or more configuration conditions.

21. The UE of claim 20, wherein the one or more configuration conditions include an offset between a channel state information measurement or reporting instance and a codebook application slot.

22. The UE of claim 20, wherein the one or more configuration conditions include a codebook size in the TD or DD basis.

23. The UE of claim 20, wherein the one or more configuration conditions include a channel correlation time.

24. The UE of claim 20, wherein the one or more configuration conditions include a UE-perceived Doppler profile.

25. The UE of claim 20, wherein the one or more configuration conditions include a report overhead configuration or a resource configuration.

26. The UE of claim 20, wherein the one or more configuration conditions include a quality of service requirement.

27. The UE of claim 20, wherein the codebook structure indicates a preferred preference order for the TD or DD basis or a codebook structure preferred by the UE.

28. The UE of claim 20, wherein the one or more memories further store instructions configurable to be executed by the one or more processors to cause the UE to transmit a report of the selected TD or DD basis for the codebook.

29. A network entity for wireless communication, comprising:
one or more memories; and
one or more processors coupled to the one or more memories, the one or more memories storing instructions configurable to be executed by the one or more processors to cause the network entity to:
generate a codebook structure for selecting a time domain (TD) or Doppler domain (DD) basis for a codebook based at least in part on one or more configuration conditions; and
transmit the codebook structure.

30. The network entity of claim 29, wherein the one or more memories further store instructions configurable to be executed by the one or more processors to cause the network entity to receive a report of a selected TD or DD basis that is associated with the codebook structure.

* * * * *